United States Patent
Curtis

(10) Patent No.: US 7,209,270 B2
(45) Date of Patent: Apr. 24, 2007

(54) METHOD AND APPARATUS FOR PHASE CORRELATION HOLOGRAPHIC DRIVE

(75) Inventor: Kevin R. Curtis, Longmont, CO (US)

(73) Assignee: InPhase Technologies, Inc., Longmont, CO (US)

(*) Notice: Subject to any disclaimer, the term of this patent is extended or adjusted under 35 U.S.C. 154(b) by 0 days.

(21) Appl. No.: 11/155,437

(22) Filed: Jun. 16, 2005

(65) Prior Publication Data

US 2005/0231777 A1    Oct. 20, 2005

Related U.S. Application Data

(63) Continuation of application No. 10/146,085, filed on May 13, 2002, now Pat. No. 6,909,529.

(60) Provisional application No. 60/309,202, filed on Jul. 31, 2001.

(51) Int. Cl.
*G03H 1/00* (2006.01)
(52) U.S. Cl. .................. 359/30; 359/35; 359/1
(58) Field of Classification Search ............ None
See application file for complete search history.

(56) References Cited

U.S. PATENT DOCUMENTS

| | | | | |
|---|---|---|---|---|
| 3,657,473 A | * | 4/1972 | Corcoran ............... | 386/128 |
| 3,899,240 A | | 8/1975 | Gabor .................. | 359/10 |
| 5,638,193 A | | 6/1997 | Trisnadi et al. ......... | 359/11 |
| 5,703,705 A | | 12/1997 | Curtis et al. ........... | 359/22 |
| 5,719,691 A | | 2/1998 | Curtis et al. ........... | 359/11 |
| 5,874,187 A | | 2/1999 | Colvin et al. .......... | 430/2 |
| 5,892,601 A | | 4/1999 | Curtis et al. ........... | 359/22 |
| 5,932,045 A | | 8/1999 | Campbell et al. ....... | 156/102 |

(Continued)

FOREIGN PATENT DOCUMENTS

JP        11-242424 A      9/1999

(Continued)

OTHER PUBLICATIONS

Barbastathis, G. et al. (2000). "Volume Holographic Multiplex Methods," *In Holographic Data Storage* Coufal, H. J. et al. eds., Springer-Verlag, pg. 22.

(Continued)

*Primary Examiner*—Arnel Lavarias
(74) *Attorney, Agent, or Firm*—Morrison & Foerster LLP

(57) ABSTRACT

A holographic storage apparatus for recording data in a holographic medium includes at least one light source for generating a reference beam and a signal beam. The reference beam is preferably a phase beam of unchanging phase content. The apparatus also includes a holographic medium placed in a path of the reference beam and a path of the signal beam. The holographic medium has a first face and both the reference beam and the signal beam enter the holographic medium through the first face. The holographic medium also includes a data reflective surface. The reference beam and the signal beam interfere in the holographic medium to create a hologram only after at least one of the reference beam and the signal beam have reflected off of the data reflective surface.

40 Claims, 12 Drawing Sheets

U.S. PATENT DOCUMENTS

| | | | |
|---|---|---|---|
| 5,943,145 A | 8/1999 | Curtis et al. | 359/22 |
| 6,018,402 A | 1/2000 | Campbell et al. | 359/22 |
| 6,020,985 A | 2/2000 | McLeod et al. | 359/22 |
| 6,103,454 A | 8/2000 | Dhar et al. | 430/290 |
| 6,104,511 A | 8/2000 | Hesselink et al. | 359/22 |
| 6,157,473 A | 12/2000 | Jang et al. | 359/22 |
| 6,191,875 B1 | 2/2001 | Curtis et al. | 359/11 |
| 6,798,547 B2 | 9/2004 | Wilson et al. | 359/10 |
| 6,909,529 B2 | 6/2005 | Curtis | 359/30 |
| 2002/0071145 A1 | 6/2002 | Roh | 359/35 |
| 2003/0063342 A1 | 4/2003 | Horimai | 359/22 |

FOREIGN PATENT DOCUMENTS

| | | |
|---|---|---|
| WO | WO-99/57719 A1 | 11/1999 |
| WO | WO-03/012782 A1 | 2/2003 |

OTHER PUBLICATIONS

Barbastathis, G. et al. (2000). "Volume Holographic Multiplex Methods," *In Holographic Data Storage* Coufal, H. J. et al. eds., Springer-Verlag. pp. 35-47.

Barbastathis, G. et al. (2000). "Volume Holographic Multiplex Methods," *Holographic Data Storage* Coufal, H. J. et al. eds., Springer-Verlag, pp. 53-55.

Dhar, L. (Jun./Jul. 2001). "A New Venture in Holographic Storage," *The Industrial Physicist* pp. 26-27.

Dhar, L. et al. (Apr. 1999). "Recording Media That Exhibit High Dynamic Range for Digital Holographic Data Storage," *Optics Letters* 24(7):487-489.

Redfield, S. (2000). "Tamarack Optical Head Holographic Storage" *In Holographic Data Storage* Coufal, H. J. et al. eds. Springer-Verlag. pp. 343-357.

Saito, K. et al. (1998). "Holographic 3-D Disk Using In-Line Face-to-Face Recording,". Optical Media Laboratory, Sony Corporation, Tokyo, Japan and Comets Corporation, Tokyo, Japan. pp. 162/WC3-1-164/WC3-3.

Shelby, R.M. et al. (2000). "Media Requirements for Digital Holographic Data Storage," *In Holographic Data Storage* Coufal, H. J. et al. eds., Springer-Verlag. pp. 101-111.

Zhou, G. et al. (2000). "Beam Deflectors and Spatial Light Modulators for Holographic Storage Application" *Holographic Data Storage* Coufal, H. J. et al. eds. Springer-Verlag. pp. 241-257.

\* cited by examiner

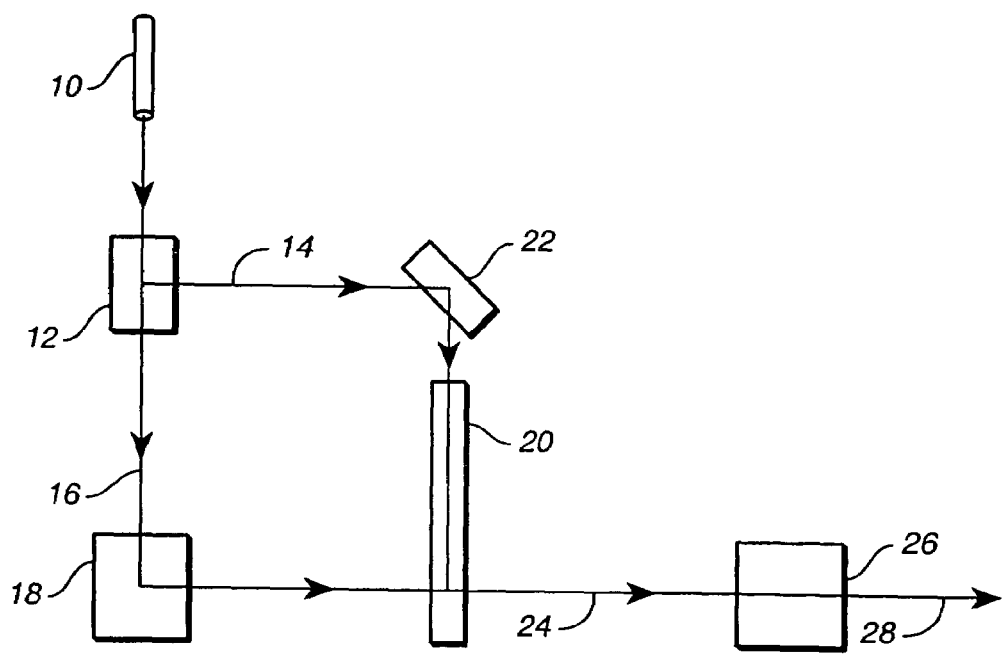
FIG._1 (PRIOR ART)
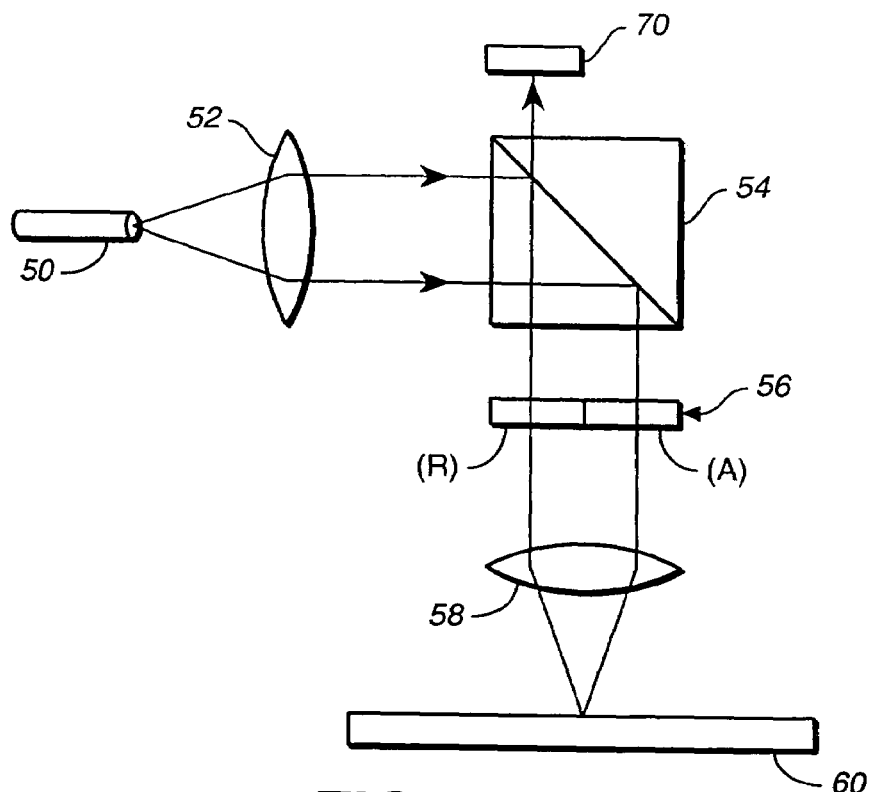
FIG._2 (PRIOR ART)

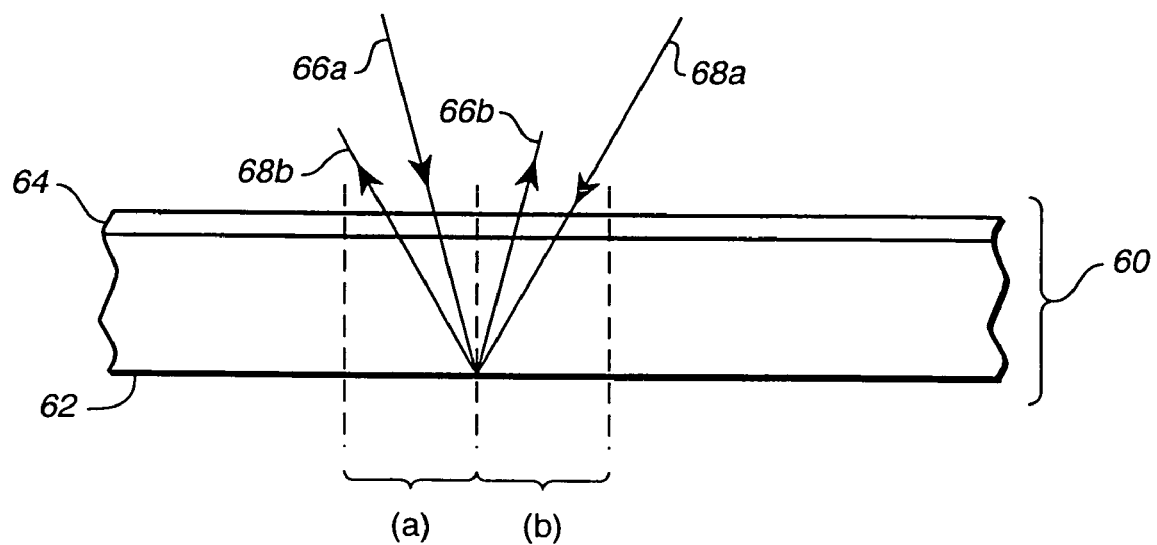
FIG._3 *(PRIOR ART)*
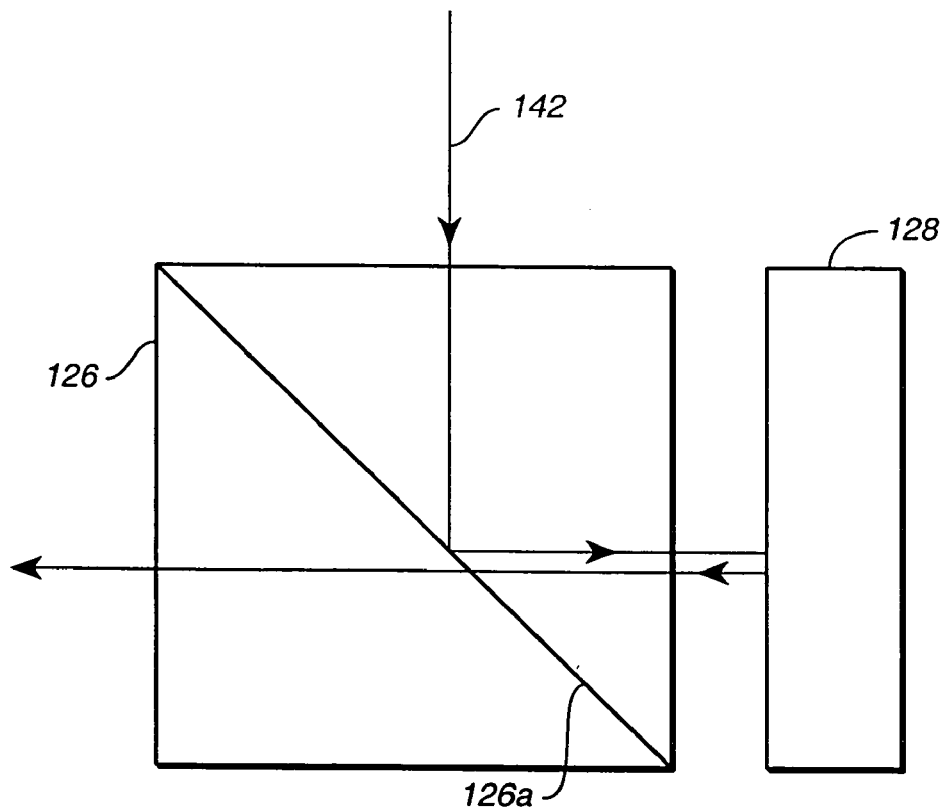
FIG._5

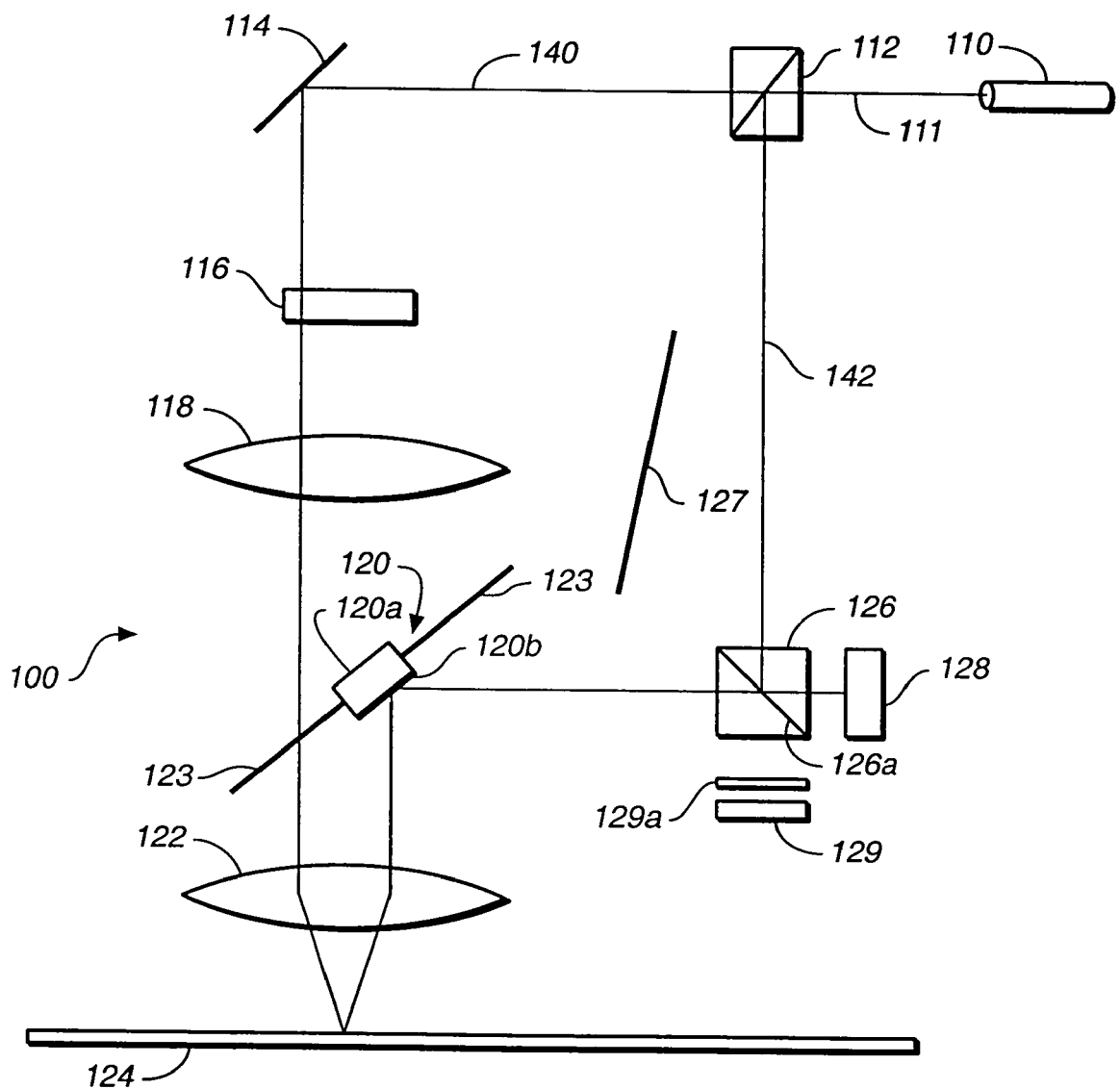
FIG._4

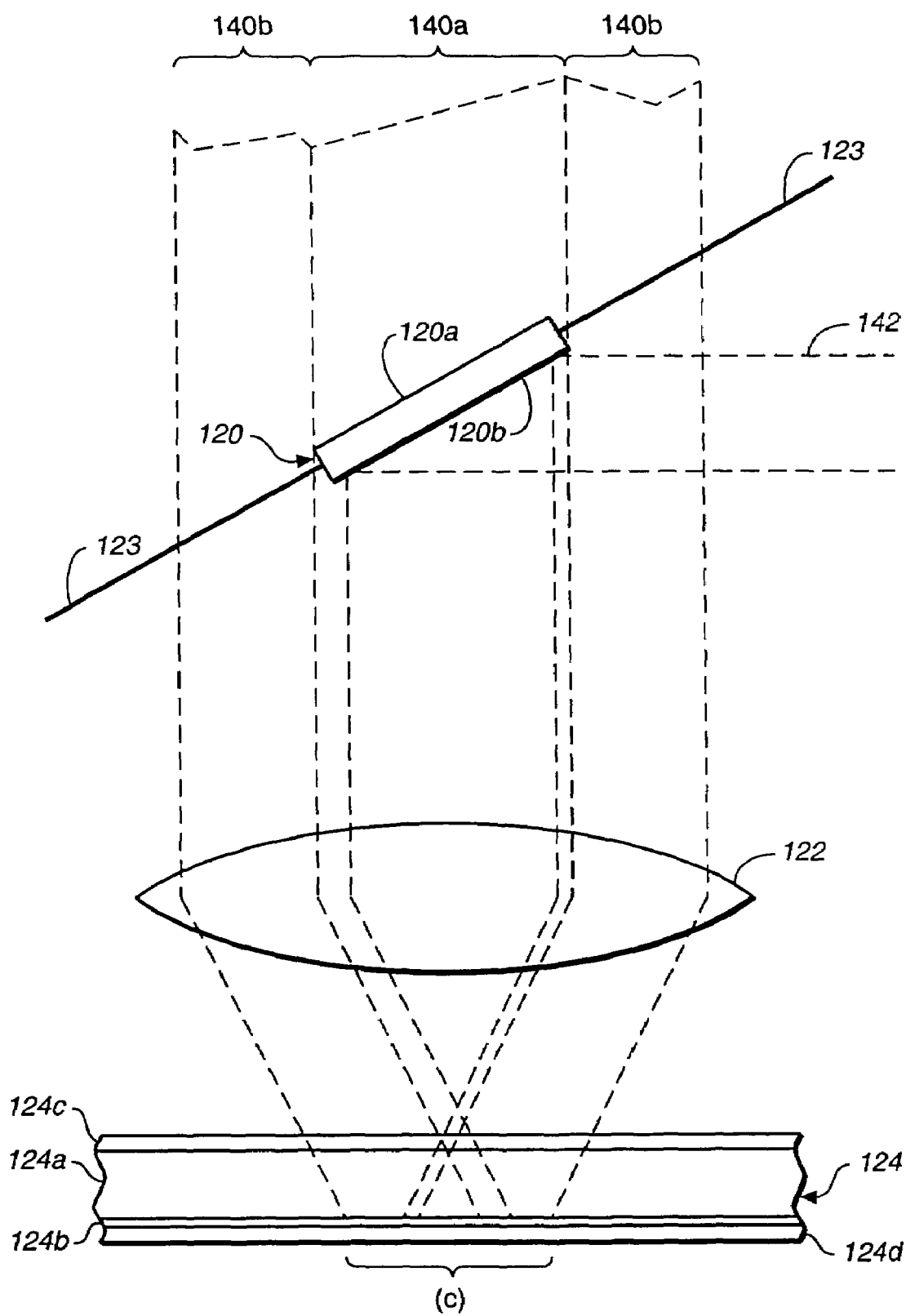
FIG._6

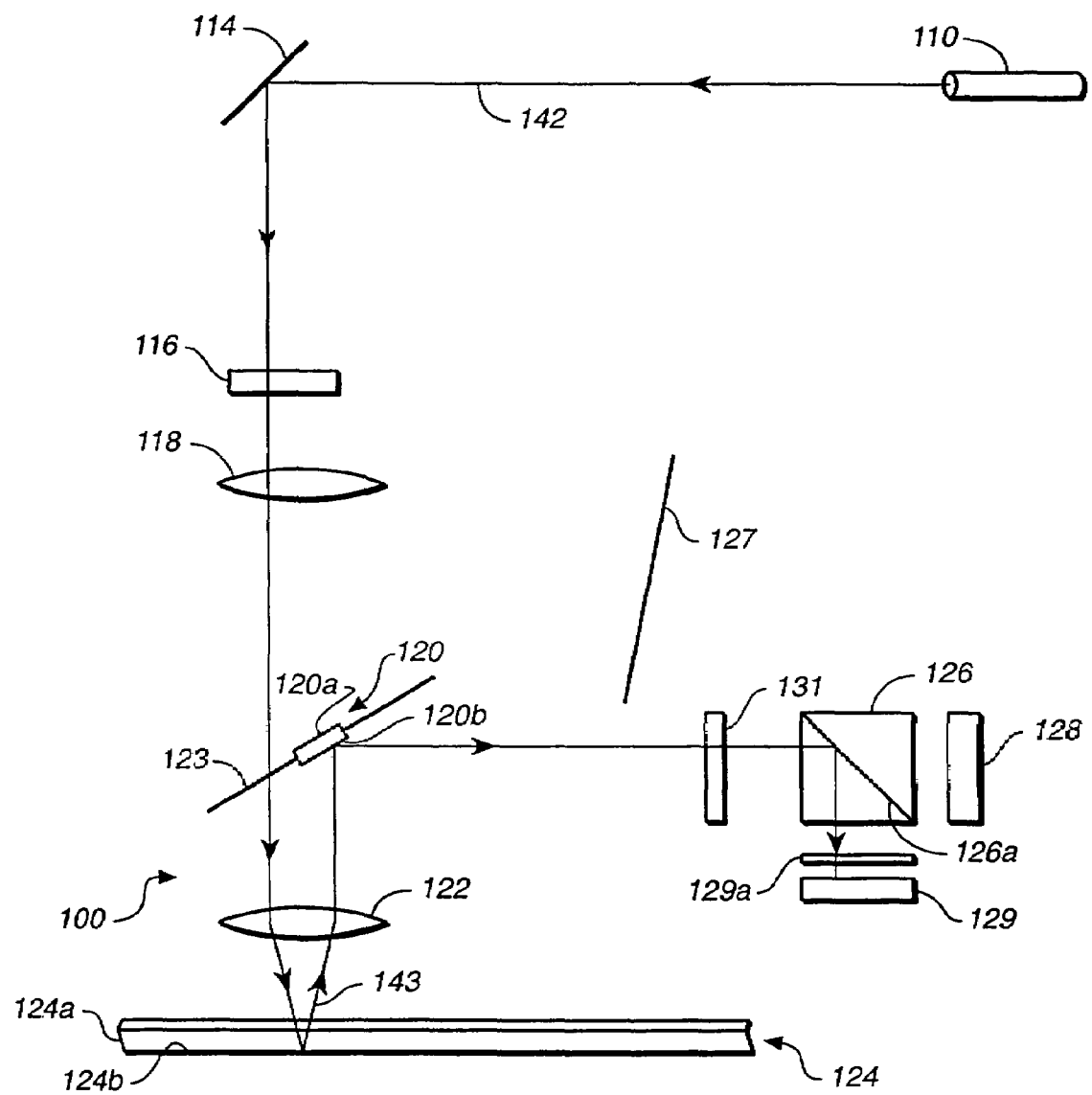
FIG._7

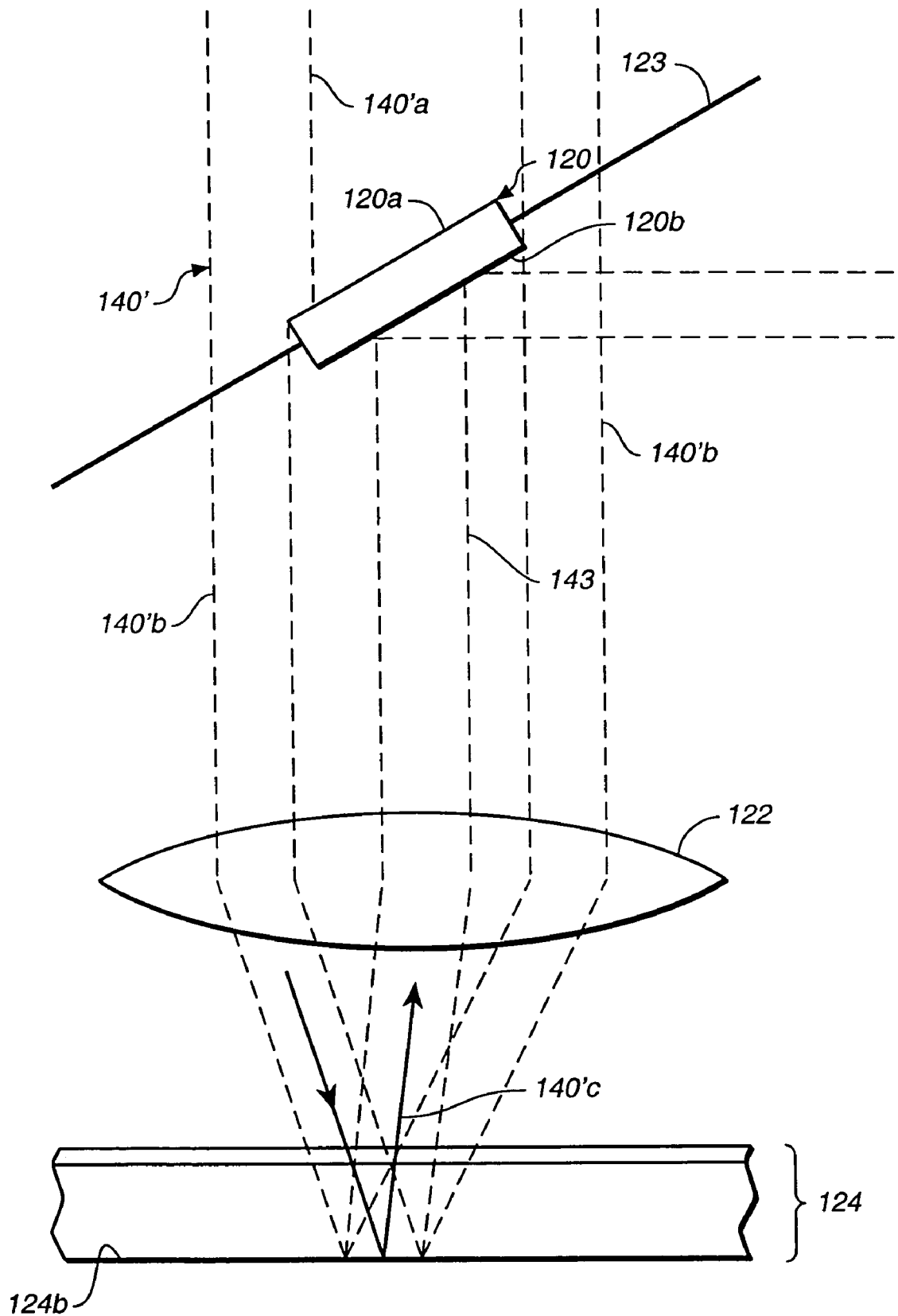
FIG._8

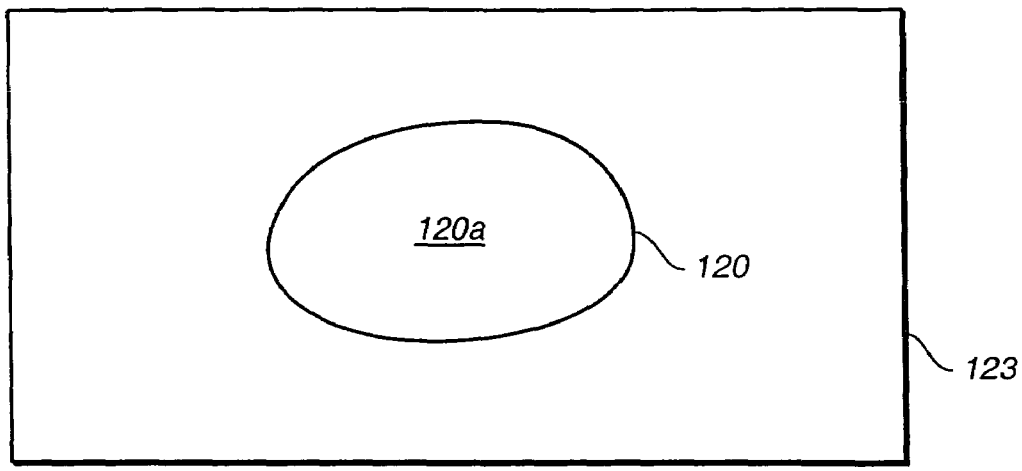
FIG._9
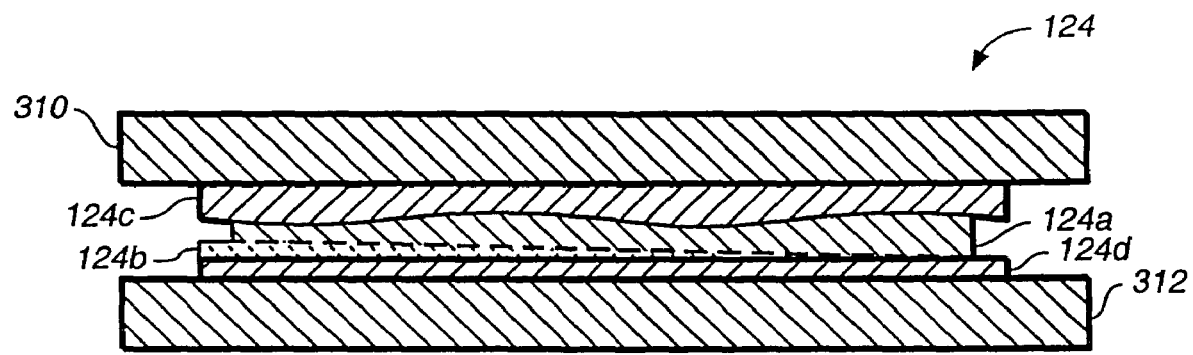
FIG._10

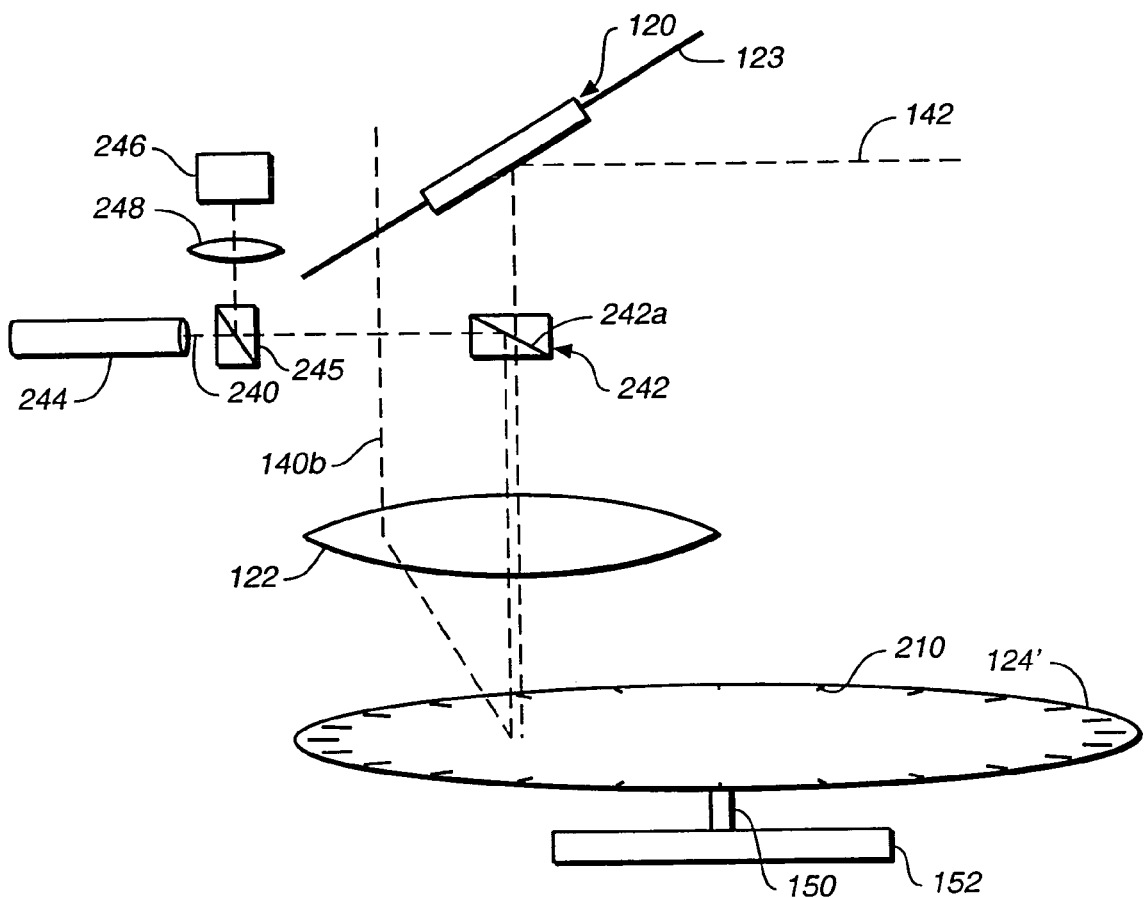
FIG._11
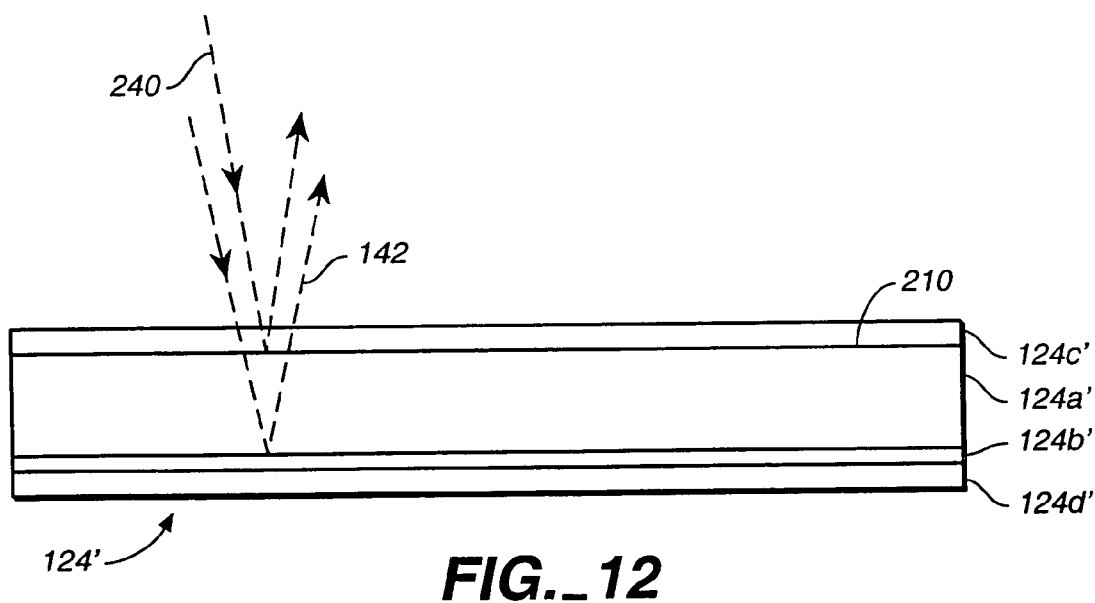
FIG._12

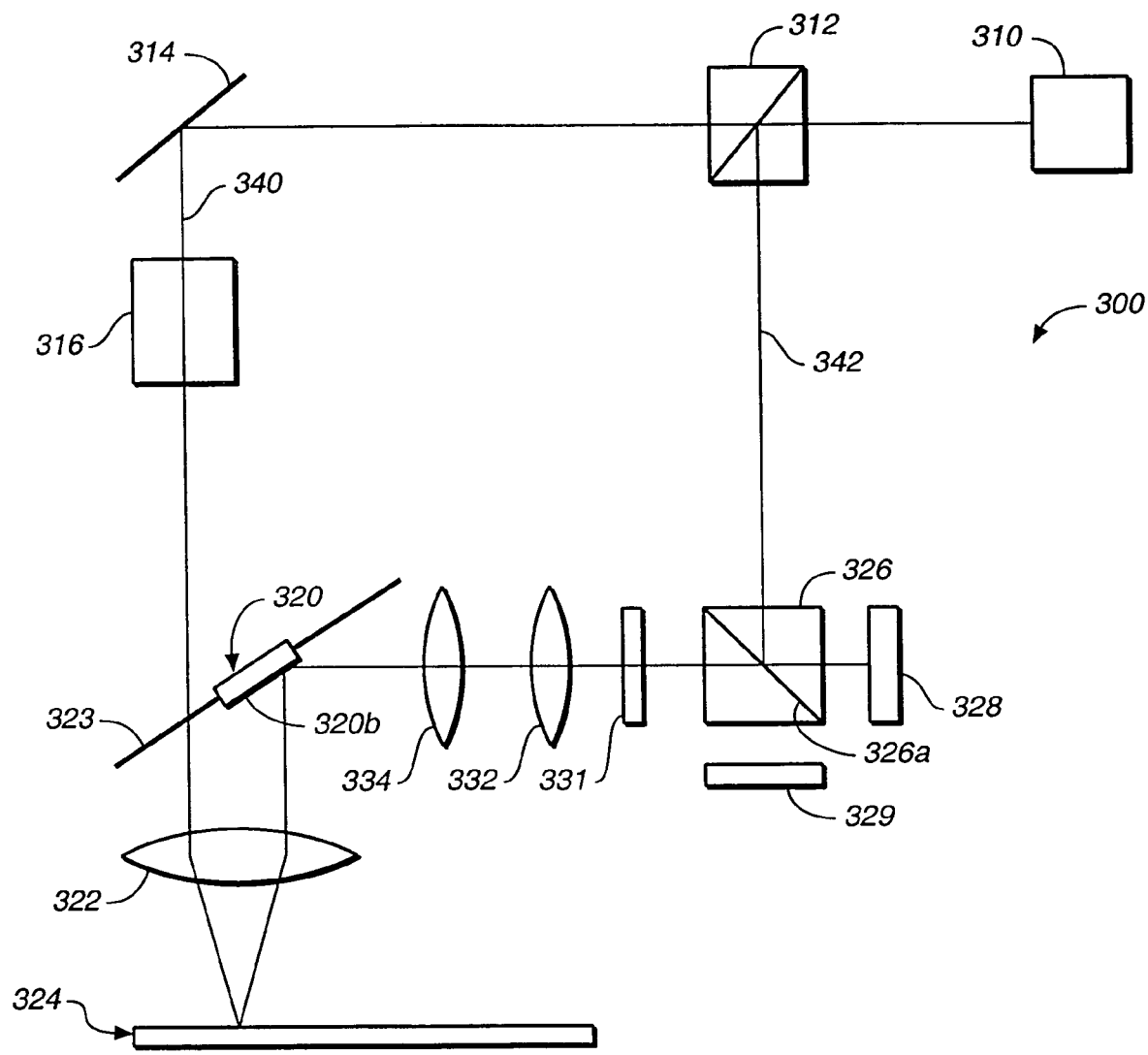
FIG._13

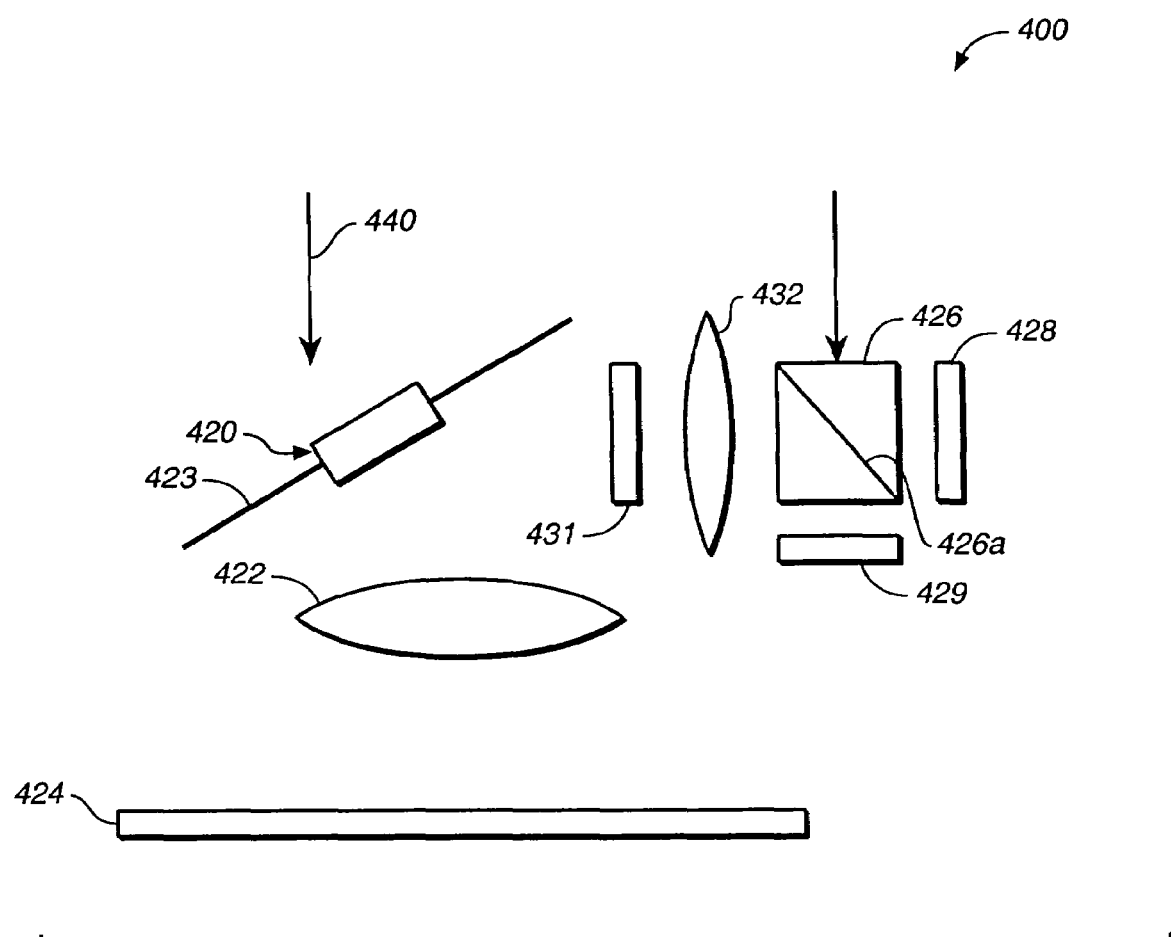
FIG._14

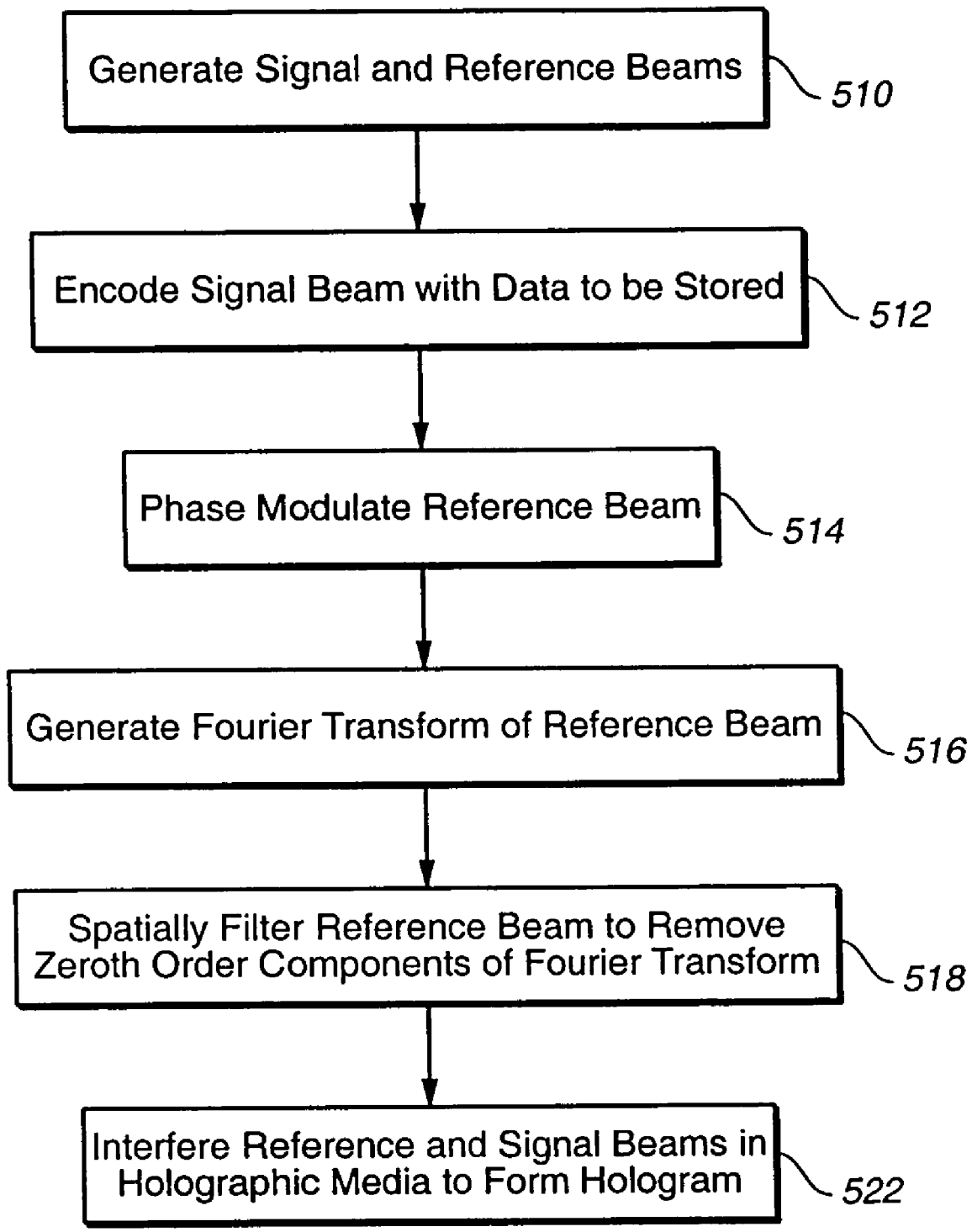
FIG._15

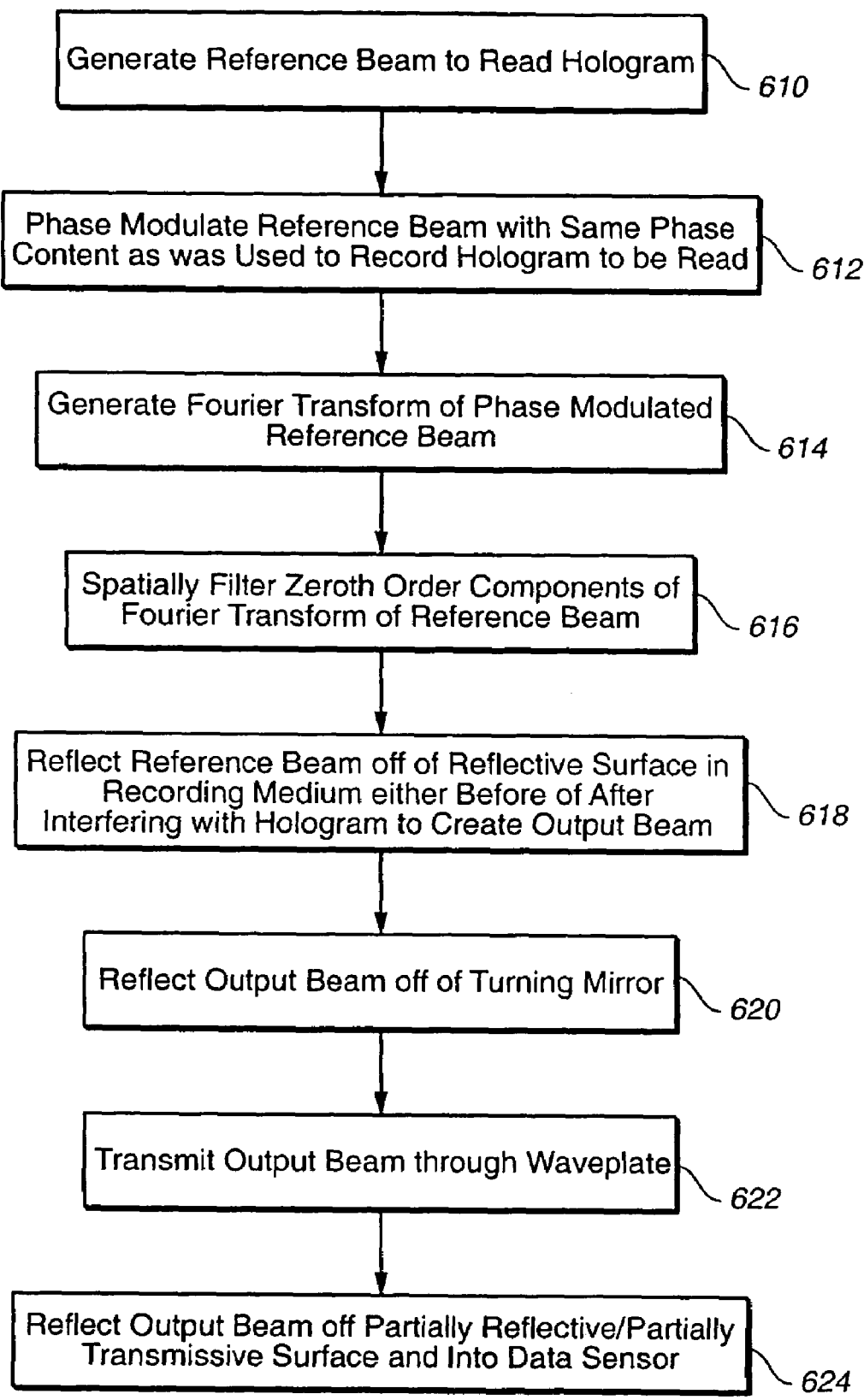
FIG._16

METHOD AND APPARATUS FOR PHASE CORRELATION HOLOGRAPHIC DRIVE

RELATED APPLICATIONS

The present application is a continuation of U.S. patent application Ser. No. 10/146,085 filed May 13, 2002 now U.S. Pat. No. 6,909,529 entitled METHOD AND APPARATUS FOR PHASE CORRELATION HOLOGRAPHIC DRIVE which claims priority to U.S. Provisional Patent Application No. 60/309,202, filed Jul. 31, 2001, entitled "Holographic Drive and Media Architecture" by Kevin R. Curtis, and incorporates that provisional application by reference.

TECHNICAL FIELD

The present invention relates to holographic storage. More specifically, the present invention relates to a system and method for storing phase correlation multiplexed holograms in a holographic medium.

BACKGROUND

Holographic memory systems involve the three-dimensional storage of holographic representations (i.e. holograms) of data elements as a pattern of varying refractive index and/or absorption imprinted in the volume of a storage medium such as a crystal of lithium niobate. Holographic memory systems are characterized by their high density storage potential and the potential speed with which the stored data is randomly accessed and transferred.

In general, holographic storage memory systems operate by combining a data-encoded signal beam with a reference beam to create an interference pattern throughout a photosensitive storage medium. The interference pattern induces material alterations in the storage medium that generate a hologram. The formation of the hologram in the storage medium is a function of the relative amplitudes and polarization states of, and phase differences between, the signal beam and the reference beam. It is also highly dependent on the incidents beam's wavelengths and angles at which the signal beam and the reference beam are projected into the storage medium.

Holographically stored data is reconstructed by projecting a reference beam similar to the reference beam used in storing the data into the storage medium at the same angle, wavelength, phase and position used to produce the hologram. The hologram and the referenced beam interact to reconstruct the signal beam. The reconstructed signal beam then is detected by using, for example, a photo-detector array. The recovered data then is post processed for delivery to output devices.

Various holographic storage drives have been designed in which a holographic medium in the form of a disk, card or the like, is used to record data and read the recorded data back in a manner similar to that of a magnetic hard disk drive used in personal computers. Such drives are typically provided with a mechanism to allow recording and access of holograms substantially throughout the spatial extent of the holographic disk or card. This allows such storage devices to advantageously store a relatively large amount of data. One such holographic drive was proposed by Tamarack Storage Devices, Inc. and is discussed in H. J. Coufal et al., Holographic Data Storage, Springer, pp. 343–357, which is hereby incorporated by reference.

FIG. 1 illustrates the general architecture of this drive. Beam splitter 12 splits a beam of coherent light emitted by laser 10 into a reference beam 14 and a signal beam 16. A spatial light modulator ("SLM") and associated optics 18 encode signal beam 16 with data to be recorded in holographic media 20 and focus signal beam 16 into holographic media 20. After splitting, reference beam 14 is processed by phase or angle generating optics 22 and directed into transmissive holographic media 20 to form a hologram with signal beam 16. On reconstruction, the phase or angle of reference beam 14 is reproduced and the hologram regenerated in output beam 24. Output beam 24 is processed by CCD and associated optics 26 to generate electrical output data 28. All of the recording and reading optics and electronics are mounted in a head (not shown) which travels across the holographic media 20 to allow access to different locations in holographic media 20.

One drawback with the Tamarack design is that it uses a transmission geometry. That is, reconstruction takes place on the opposite side of holographic media 20 from signal beam 16. This means that reconstruction components such as CCD and associated optics 26 must be placed on the opposite side of holographic media 20 from the object beam components such as SLM and associated optics 18. As such, this type of architecture requires space on both sides of the holographic media which generally requires a relatively large volume. Thus, a holographic drive using such a transmission type architecture may be unsuitable for popular applications where relatively compact data storage is desirable, such as desktop or laptop computers.

A second holographic drive is disclosed in K. Saito and H. Horimai, Holographic 3-D Disk using In-line Face-to-Face Recording, Optical Media Laboratory, Sony Corporation ("Saito"). The general architecture of the device disclosed in Saito is shown in FIG. 2. During recording, a laser 50 projects coherent light through a collimation lens 52, into beam splitter 54 and towards SLM 56. A bitmapped pattern to be recorded is displayed in region (A) and region (R) is made transparent. In this way, light incident on region (R) generates a reference beam and light incident on region (A) generates the signal beam. The reference and signal beams then pass through objective lens 58 to reflective holographic recording medium 60 to record a hologram therein. As shown in FIG. 3, holographic medium 60 is made reflective by including a reflective surface 62 on a plane beneath a photosensitive holographic layer 64. In this way, a first hologram of the data input via incident signal beam 68a is formed in region (a) by reflected signal beam 68b interfering with incident reference beam 66a. A second hologram of the input data is formed in region (b) by incident signal beam 68a interfering with reflected reference beam 66b.

Holographic media 60 is in the form of a disk which can be spatially translated to allow multiple holograms to be recorded therein with significant overlap between holograms. Thus, the holographic drive of Saito relies on shift multiplexing to store a relatively large number of holograms in holographic media 60.

Though not discussed in Saito, one method of effecting a readout of a hologram stored in medium 60 shown in FIG. 2 is to polarize region (R) of SLM 56 to block light emitted by laser 50 while region (A) remains transparent to such light. In this way, the reference beam to readout data stored in holographic medium 60 is provided by light passing through region (A) of SLM 56. After reflecting off of holographic medium 60, the reconstructed output beam can be polarized to pass through region (R) of SLM 56, through beam splitter 54 and to CCD and related optics 70.

As discussed above, the holographic drive disclosed in Saito uses reflective holographic media. As such, both the recording and readout optics and electronics can be placed on the same side of the media. In this way, the holographic drive of Saito overcomes a drawback of the Tamarack device of requiring a relatively large volume. However, in doing so, some other undesirable features are introduced. First, as noted above, the drive disclosed by Saito uses shift multiplexing. And, in a geometry in which the reference signal and output beams are normal to the recording surface (as disclosed by Saito) the selectivity between shift multiplexed holograms can be relatively low. That is, holograms that are at adjacent locations to a target hologram (e.g., a hologram that is being read) can generate interference when reading the target hologram. Such interference can lower the signal to noise ratio in the readout signal of the target holograms and ultimately lead to errors or severely limit the achievable density. This problem can be exacerbated by the fact that the signal and reference beams share the same angular bandwidth because beams near a center axis of the system will create holograms having very low selectivity.

SUMMARY OF THE INVENTION

In a method and apparatus in accordance with the present invention, a holographic storage apparatus for recording data in a holographic medium includes at least one light source for generating a reference beam and a signal beam. The reference beam is preferably a phase correlation beam of unchanging phase content. The apparatus also includes a holographic medium placed in a path of the reference beam and a path of the signal beam. The holographic medium has a first face and both the reference beam and the signal beam enter the holographic medium through the first face to create a hologram. The holographic medium also includes a reflective surface such that in reading information stored in the holographic medium at least a portion of the reference beam is reflected off the reflective surface to generate an output beam.

Preferably, but not necessarily, the reference beam is phase modulated, that is, a phase beam of unchanging phase content is generated, by transmitting the reference beam through a phase mask. When phase modulating the reference beam in this manner, it is also preferable to generate a Fourier transform of the reference beam and filter out the zeroth order components of the Fourier transform of the reference beam. Such spatial filtration can be achieved by appropriately positioning an opaque filter in the path of the reference beam after generating the Fourier transform.

In another embodiment of an apparatus in accordance with the present invention a holographic storage apparatus includes at least one light source for generating a reference beam and a signal beam. The signal beam carries information to be stored by the holographic storage apparatus. The storage apparatus also includes a phase mask positioned in a path of the reference beam and to phase modulate the reference beam and a filter block. The Filter block includes a reflective surface and is positioned relative to the path of the reference beam and the path of the object beam such that in recording data, a portion of the reference beam is blocked by the filter block. A transmitted portion of the reference beam bypasses the filter block to interfere with the signal beam after the signal beam has been reflected off the reflective surface of the filter block.

In a method of managing data using a storage medium in accordance with the present invention, a reference beam and a signal beam are generated. The signal beam includes the information to be managed. The reference beam is phase correlation beam and a holographic medium is provided which has a reflective surface. The signal beam and reference beam then interfere in the holographic medium to create a phase-correlation hologram therein. On reconstruction the reconstructed signal (output) beam is in a different angular bandwidth than the directly reflected reference beam allowing the filter/mirror to physically separate the signal from the noise generated by the reference beam.

BRIEF DESCRIPTION OF THE DRAWINGS

FIG. 1 is a diagram illustrating the architecture of a prior art holographic data recording system using a transmissive recording medium.

FIG. 2 is a diagram illustrating the architecture of a prior art holographic data recording system using shift multiplexing and a reflective recording medium.

FIG. 3 is a diagram detailing how the holographic data recording system of FIG. 2 records a hologram.

FIG. 4 is a diagram of a first embodiment of a holographic storage drive in accordance with the present invention.

FIG. 5 is a diagram detailing how a beam splitter and reflective SLM are used to encode a signal beam with data in the holographic storage drive of FIG. 4.

FIG. 6 is a diagram detailing how the holographic storage drive of FIG. 4 records a hologram in a reflective holographic medium.

FIG. 7 is a diagram illustrating how the holographic storage drive of FIG. 4 reproduces a hologram.

FIG. 8 is a diagram detailing how the holographic storage drive of FIG. 4 reads a hologram from the holographic medium shown in FIG. 6.

FIG. 9 is a top view of a block and transparent mask of the holographic storage drive of FIG. 4.

FIG. 10 is a cutaway view illustrating one embodiment of the fabrication of a holographic storage medium which can be used in a holographic storage drive of the present invention.

FIG. 11 is a diagram illustrating the architecture of another embodiment of the present invention including a servo beam source, servo beam splitter and a rotatable holographic medium including servo marks.

FIG. 12 is a side view of the holographic storage medium shown in FIG. 11 illustrating detection of servo marks.

FIG. 13 is an illustration of the architecture of a second embodiment of a holographic storage device of the present invention including a holographic optical element for phase correlation modulating a reference beam.

FIG. 14 is an illustration of the architecture of another embodiment of the signal and reproduction optics of a holographic storage drive in accordance with the present invention including an image plane lens.

FIG. 15 is a flow chart illustrating a method of recording phase-correlation holograms in accordance with the present invention.

FIG. 16 is a flow chart illustrating a method of reading phase-correlation holograms in accordance with the present invention.

DETAILED DESCRIPTION

A system and method for storing and reading out holographic information in a drive format in accordance with the present invention preferably uses a reflective holographic recording medium. As such, all the recording and reading optics can be located on one side of the recording medium.

Thus, a holographic storage drive of the present invention can be advantageously more compact than a drive using a transmission configuration which would include optics on both sides of the recording medium. Additionally, the holographic storage drive of the present invention uses phase-correlation holography and preferably filters out low spatial frequency components of the reference beam. As such relatively high selectivity between holograms can be advantageously achieved, even in a configuration in which reference and signal beams are incident on the holographic recording medium at angles at or near the normal to the media surface. Also, in a holographic storage drive in accordance with the present invention, polarization is preferably not used on reconstruction to separate the reference and output beams. As such, noise in the output beam caused by incomplete filtering of the reference beam and system and media birefringence can advantageously be avoided, allowing much weaker signals to be detected with good signal to noise ratio. This can allow realization of higher holographic recording densities FIG. 4 illustrates a preferred embodiment of a general architecture of a holographic storage drive 100 in accordance with the present invention. Storage drive 100 includes a laser light source 110 which directs coherent radiation into a source beam splitter 112 which divides the source beam 111 into a reference beam 140 and an signal beam 142. It is to be understood that FIG. 4 is provided to illustrate a general architecture. As such, only a partial width of reference beam 140 and signal beam 142 is shown in FIG. 4. In a reference beam path, storage drive 100 additionally includes a turning mirror 114, a Fourier Transform (FT) lens 118 an object lens 122, and holographic recording medium 124 which is preferably located approximately one focal length of object lens 122 from object lens 122 and which will be discussed in greater detail below. Preferably, the reference beam path additionally includes a phase mask 116 located between turning mirror 114 and FT lens 118, and block 120 located between FT lens 118 and object lens 122. FT lens 118 and object lens 122 roughly image the phase mask 116 on to the media. Phase mask 116 is for introducing phase modulation into reference beam 140. That is, phase mask 116 generates a phase beam of unchanging phase content. Block 120 is preferably surrounded and supported by a substantially transparent mask 123 and absorbs a portion of reference beam 140. Both phase mask 116 and block 120 will be discussed in greater detail below.

As shown in FIG. 4, reference beam 140 exits beam splitter 112 and is preferably re-directed by first turning mirror 114 into phase mask 116. Phase mask 116 modulates the reference beam 140 in the direction defined by the optical axis of the reference beam 140. The addressing mechanism used for the multiplexed holograms in holographic medium 124 is a slight displacement of the media or optics relative to each other so that holograms are partially overlapped. It is also possible to multiplex some holograms in the same place by changing pattern displayed by the phase mask 116 or by changing the phase mask 116 position (e.g. rotation or translation). For effective discrimination, when changing patterns displayed by the phase mask, the different pattern preferably belong to a set of orthogonal codes. Additionally, for minimizing noise, the average phase variation for the entire mask is preferably close to zero. A phase mask can be implemented in a sheet of ground glass having pits or pixels which introduce a preferred phase variation of $\lambda/2$ where $\lambda$ is the wavelength of reference beam 140. Preferably, a phase mask containing at least 200 pixels is used. Modulation of a reference beam by a phase a mask and phase masks used for phase correlation multiplexing are fully described in U.S. Pat. No. 5,719,691 entitled Phase Correlation Multiplex Holography issued Feb. 17, 1998 to Curtis et al. which is hereby incorporated in its entirety by reference.

After passing through phase mask 116, reference beam 140 preferably passes through Fourier transform lens 118, which produces a two-dimensional Fourier transform of the input signal, in the vicinity of block 120. Block 120 preferably includes two primary surfaces; absorptive surface 120a and reflective surface 120b. Absorptive surface 120a is opposite reflective surface 120b, faces Fourier transform lens 118 and preferably acts to substantially absorb or otherwise block the portion of reference beam 140 which is incident thereon. Additionally, in the embodiment shown in FIG. 4, the block 120 is preferably located at the Fourier plane of Fourier lens 118, and as discussed in greater detail below, is positioned in a central region of reference beam 140. It is to be understood that absorptive surface 120a may instead be a reflective surface.

By placing block 120 is a central region of reference beam 140, block 120 can spatially filter zeroth order components of the Fourier transform of phase modulated reference beam 140 which correspond to lower spatial frequency components of reference beam 140. As discussed in detail in Curtis et al., such spatial filtration is important when using a conventional phase mask in order to generate a relatively sharp peaked auto-correlation function for a given phase mask. This advantageously provides for improved selectivity when reading multiplexed holograms from storage medium 124. Preferably, block 120 is positioned to allow the non-central portion of reference beam 140 that contains the higher order components of the Fourier transform of reference beam 140 to pass through transparent mask 123. The portion of reference beam 140 which passes through transparent mask is transformed by object lens 122 onto recording medium 124.

Turning now to the signal beam path, after exiting source beam splitter 112, signal beam 142 enters signal beam splitter 126. The path of signal beam 142 in signal beam splitter 126 is shown in detail in FIG. 5. As shown in FIG. 5, beam splitter 126 includes a partially reflective-partially transmissive surface 126a. As signal beam 142 enters beam splitter 126, it is first reflected off surface 126a at a ninety degree angle to its initial direction of propagation. Signal beam 142 is then directed out of beam splitter 126 and into reflective SLM 128 which encodes signal beam 142 with the data which is to be stored in recording medium 124. SLMs that are used to encode a signal beam with data are well understood by those skilled in the art and generally include a two dimensional matrix of squares. Each square in the matrix can be directed to transmit light, corresponding to a binary 1, or to block light, corresponding to a binary 0. SLMs are typically, though not necessarily, implemented as a two-dimensional grid of liquid-crystal modulators or an array of micro-cantilever-based deflectors to act as a data array followed by a polarizer. A reflective SLM also includes a reflective surface placed behind the data array. SLMs are discussed in detail in Coufal, pp. 241–257, which is hereby incorporated by reference. Beam splitter 126 is preferably a polarizing beam splitter so that surface 126a either transmits or reflects a light beam incident thereon depending on the polarization state of the light beam. If SLM 128 works by modulating the polarization of the light (as in a liquid crystal based modulators) then the polarizing beam splitter is also the analyzer for the SLM to generate the image. If SLM 128 works by non-polarization means, then beam splitter 126 can be a non-polarizing element; for example, an element that works using the critical angle for reflection onto the SLM.

As shown in FIG. 7, storage drive 100 can also optionally include a light blocking surface 127 to prevent light from the signal beam path from interfering with the reference-beam path and vice-versa. After being encoded with data to be recorded in holographic medium 124, signal beam 142 is turned 180 degrees by the reflective surface of SLM 128 and passes back into signal beam splitter 126, through surface 126a and out of signal beam splitter 126. Referring again to FIG. 4, after exiting signal beam splitter 126, signal beam 142 enters the vicinity of block 120. Signal beam 142 strikes reflective surface 120b of block 120 and is turned approximately 90 degrees to be directed through object lens 122 which focuses signal beam 142 onto holographic medium 124 where it interferes with reference beam 140 to create a hologram in holographic medium 124.

In the embodiment shown in FIG. 4, phase mask 116, Fourier lens 118, block 120, object lens 122 and holographic medium 124 are positioned with respect to one another such that these five components form a "4f" system. In particular, the focal length of Fourier lens 118 is substantially equal to the focal length of object lens 122 and the distance between each adjacent component is approximately equal to this focal length. In this way, the Fourier plane for the phase modulated reference beam 140 is approximately at block 120. This facilitates effective filtering of the zeroth order component of the Fourier transform of phase modulated reference beam 140. Preferred focal lengths for the object lens 122 is consistent with CD or DVD drive focal lengths (4–10 mm) to facilitate backwards compatibility with these technologies, which is discussed in detail below.

FIG. 6 illustrates how reference beam 140 is filtered by block 120 and generally how filtered reference beam 140 and signal beam 142 interact to form a hologram in holographic medium 124. As noted above, Fourier transform lens 118 generates a Fourier transform of reference beam 140. Zero order components of the Fourier transform beam will be spatially located at the center region of reference beam 140. To increase selectivity between holograms on reconstruction, it is desirable to filter out all of the zeroth order components of the Fourier transform of the reference beam. Accordingly, as shown in FIG. 6, block 120 is preferably positioned so that absorptive surface 120a of block 120 filters out the center region 140a of reference beam 140 and allows transmitted reference beam portion 140b, which contain the higher order components of the Fourier transform, to pass around the edges of block 120 and through transparent mask 123. Preferably, more than 50% of the zeroth order components of the Fourier transform of the reference beam are filtered out and more preferably, more that 90% of such components are filtered out. After passing through transparent mask 123, transmitted reference beam portion 140b passes through object lens 122 and into holographic medium 124.

Also as shown in FIG. 6, reflective surface 120b of block 120 is angled with respect to the propagation direction of signal beam 142 as it exits signal beam splitter 126. The angle of reflective surface 120b of block 120 is such that signal beam 142 is directed towards object lens 122 along a path that is substantially parallel to the reference beam optical axis or media normal. Preferably, signal beam 142 is emitted from signal beam splitter 126 in a direction that is substantially parallel to the surface of holographic material 124. And, preferably, reflective surface 120b of block 120 is placed at an approximately 45 degree angle with the propagation direction of signal beam 142 as it is emitted from signal beam splitter 126.

Holographic medium 124 preferably includes a first substrate layer 124c closest to object lens 122 and overlaying a photosensitive layer 124a, and a reflective layer 124b sandwiched between photosensitive layer 124a and a second substrate layer 124d. Preferably, first substrate layer 124c, photosensitive layer 124a, reflective surface 124b and second substrate layer 124d are of substantially constant thickness throughout holographic medium 124 and are substantially parallel to each other. Additionally, the distance between object lens 122 and reflective surface 124b is preferably approximately the focal length of object lens 122 for the wavelength of reference beam 140 and signal beam 142. More preferably, the distance between object lens 122 and reflective surface 124b varies no more than plus or minus 50 microns from the nominal focal length chosen. In this way, object lens 122 causes transmitted reference beam portion 140b to converge with signal beam 142 to both be focused approximately onto an area (C) of reflective surface 124b. The area (C) is roughly the image size of the illuminated phase mask 116. Changing the focal length of FT lens 118 relative to the object lens 122 focal length changes the magnification of the optical system and therefore the size of (C).

Photosensitive layer 124a of holographic material 124 is preferably located between reflective surface 124b and object lens 122. It records a complex hologram of the many signal and reference beam components that are both incident and reflected.

FIG. 7 shows a preferred system and method for accessing or reading holographic data from holographic medium 124 of holographic storage drive 100. Laser 110 generates a reference beam 140' which traverses a similar path through holographic storage drive 100 to read data from holographic medium 124 as reference beam 140 traversed to write data thereto. Reference beam 140' is generated by laser 110. However, on a data read, because no signal beam is necessary reference beam 140' is preferably not directed through a reference beam splitter, such as reference beam splitter 112 shown in FIG. 4, to generate a signal beam. It is also contemplated that reference beam 140' is directed through a reference beam splitter, and that the signal beam generated thereby is blocked before reaching signal beam splitter 126. Whether or not placed through a beam splitter, reference beam 140' is then reflected off turning mirror 114 and through phase mask 116.

As is understood in the art, when reproducing phase-correlated holograms only a reference beam having the same phase correlation content as the reference beam used to create the hologram to be read is able to recreate the hologram. Thus, the same phase mask 116, or a duplicate thereof, which was used to record the data must be used when reading the data. Additionally, the media and optics must be in the same relative positions. After passing through phase mask 116, reference beam 140' passes through Fourier transform lens 118 and into the vicinity of reflecting block 120. Though not shown in FIG. 7, on reproduction, the center portion of reference beam 140' is filtered out and a peripheral portion of reference beam 140' is transmitted through transparent mask 123 in the manner described above with respect to reference beam 140. The transmitted reference beam portion passes through object lens 122 and is relayed onto holographic medium 124.

At holographic medium 124, reference beam 140' is reflected by reflective surface 124b and up through photosensitive layer 124a. Because reference beam 140' has the same phase correlation content as reference beam 140 used to create the hologram to be read in photosensitive layer 124a, an output beam 143 generated by reference beam passing through holographic medium 124 recreates the hologram initially generated by the interference of reference beam 140 and signal beam 142. Specifically, the data carried by signal beam 142 and generated by SLM 128 on recording is reproduced in output beam 143.

From holographic medium 124, output beam 143 is reflected and reconstructed into object lens 122 which directs output beam 143 onto reflective surface 120b of reflecting block 120. Reflective surface 120b preferably directs output beam 143 into object beam splitter 126 and onto partially reflective-partially transmissive surface 126a thereof. Partially reflective-partially transmissive surface 126a reflects output beam 143 approximately ninety degrees into data sensor 129. Data sensor 129 must have at least as many pixel elements as the SLM 128. Data sensor 129 is preferably a CMOS or similar light-sensitive type device which detects the optical data in output beam 143. Through electronics (not shown) connected to data sensor 129, the optical data detected by data sensor 129 can be ultimately translated into the original data that was stored as is well understood in the art. This translation includes channel codes and error correction codes to get the original data back with acceptable error rates as is done in hard disks, CD, DVD, and tape drives. Optionally, holographic storage drive 100 can include a wave-plate 131 (not shown in FIG. 4) which can be a quarter-wave-plate, positioned in the output beam path directly before output beam 143 enters beam splitter 126. Wave-plate 131 can shift the polarization of the readout beam 143. In this way, if partially transmissive-partially reflective surface is polarization selective, readout beam 143 can be directed to data sensor 129 with much greater efficiency. If wave-plate 131 is a half wave-plate, then the retardation must be changed between readout and recording (i.e. the plate must be rotated).

FIG. 8 shows detail of how reference beam 140' interacts with block 120 to generate output beam 143 from holographic medium 124. As shown by arrow 140'c, after passing through transparent mask 123, transmitted reference beam portion 140'b passes through object lens 122 and through photosensitive layer 124a. The reference beam reconstructs the hologram recorded at that location with that particular phase mask 116 to form output beam 143. Preferably, the path of reference beam 140' has not changed since recording the data to be retrieved and, as noted above, the same phase mask 116 is used as was used to record the data of interest. Also, the position of holographic medium 124 has preferably not been changed. Thus, because reference beam 140' is generated by the same source and follows the same path as reference beam 140, transmitted reference beam portion 140'b will pass through photosensitive layer 124a, where a hologram of the desired data was formed as discussed above. As such, output beam will contain a reconstruction of the hologram which represents the data carried by signal beam 142 (of FIGS. 4, 5 and 6) as obtained from SLM 128. Furthermore, as shown in FIG. 8, after being reflected off of reflective surface 124b, transmitted reference beam portion 140'b is physically separate from output beam 143 at the reflective surface 120b. In this way, block 120 filters out noise from transmitted reference beam portion 140'b that would otherwise be detected by data sensor 129 in an architecture in which the optics are normal to the media, such as shown in FIG. 8.

Preferably, the position of block 120 has not been altered since recording data using signal beam 142. And, as discussed above output beam 143 will retrace the same path as signal beam 142 after being reflected from reflective surface 124b. As such, output beam 143 will be directed by reflective surface 124b and object lens 122 along the same path, but in the opposite direction, as object beam 142 followed during recording. Thus, output beam 143 will be reflected from reflective surface 120b of block 120 and directed into signal beam splitter 126 to be read by data sensor 129 (shown in FIG. 7).

As shown in FIG. 6, holographic medium is preferably formed from a number of layers including a first substrate layer 124c closest to object lens 122. Using such a holographic medium, it is possible to get a reflection from an upper layer (that is, a layer that is close to object lens 122) of the medium, such as first substrate layer 124c, that may interfere and possibly even dominate a final image to be detected by data sensor 129. To filter out a reflection from upper layers of the holographic medium, as shown in FIGS. 4 and 7, it is possible to put a filter 129a near an image plane in the path of signal beam 142 to confocally filter out the reflection from an upper surface of the media. Filter 129a preferably includes a translucent annular region surrounding a center opaque area. The center opaque area is to filter out an area of object beam 143 where a reflection from an upper surface of medium 124 would be focused. The translucent annular region allows the remainder of object beam 143 to pass into data sensor 129. Such confocal detection/filtering is common in imaging applications such as microscopes. It is also considered to provide an annular filter, such a filter 129a, as part of reflective surface 120b of block 120. In this way, if another lens is added to the path of object beam 143 before object beam 143 reaches reflective surface 120b, together with object lens 122, reflective surface 120b would act as such a confocal filter. If such confocal filtering is not desired, it is not necessary to include any type of annular filter in storage drive 100.

FIG. 9 is a top view of a preferred embodiment of block 120 and transparent mask 123. Preferably, block 120 is substantially oval in shape, transparent mask 123 is rectangular and block 120 is approximately centered in transparent mask 123. Block 120 is preferably secured to transparent mask 123 such that block 120 can be supported thereby. Transparent mask 123 is preferably formed from glass, plastic, or any other rigid, translucent material. Block 120 can be formed from glass that is coated with reflective or absorptive surface to form the blocks 120a and 120b. Reflective surface 120b (not shown in FIG. 9) is preferably a mirrored surface formed in any known way, for example dielectric or metallic coating. Absorptive surface 120a can be any surface which opaque to the wavelength of light used for a reference beam. Block 120 and transparent mask 123 can be any shape. Blocks 120a and 120b can be the same or different shape or shapes. Additionally, as shown in FIGS. 4, 6, 7, and 8, block 120 is thicker than transparent mask 123, but need not be. Also, as noted above, transparent mask 123 is preferably used to support block 120. However, it is not necessary to include transparent mask in storage drive 100 and block 120 can be supported in any other manner which will not adversely interfere with transmission of higher order Fourier components of reference beam 140 or 140'.

The construction of holographic medium 124 was discussed above with reference to FIG. 6. A method of fabricating a holographic medium suitable for use with the present invention, such as holographic medium 124, is partially disclosed in U.S. Pat. No. 5,932,045 entitled "Method for Fabricating a Multilayer Optical Article" issued to Campbell et al. on Aug. 3, 1999 ("Campbell") which is hereby incorporated by reference in its entirety. FIG. 10 will be referred to in a discussion of a preferred fabrication method. As shown in FIG. 10, to make a holographic medium 124, a first substrate layer 124c and second substrate layer 124d are affixed to first holder 310 and second holder 312, respectively, by vacuum, electrostatic force, magnetic attraction or otherwise. Preferably, first and second holders 310 and 312 were previously placed in a parallel relationship with one another. Photosensitive layer 124a, still in a viscous form, is then placed between first substrate layer 124c and second substrate layer 124d and is used as the adherent to hold first substrate layer 124c and second substrate layer 124d together. The holders 310 and 312 press first substrate layer 124c and second substrate layer 124d together with enough force to obtain a desired spread of photosensitive layer 124a. Photosensitive layer 124a is then cured.

It is possible for the adherent forming to be photocurable or otherwise curable, e.g., radiation, thermal, or chemical curable. Heat may be used to accelerate a radiation cure. When using the above method, it is preferable for the adherent to be a material that undergoes a phase transformation, e.g., liquid to solid, to attain a required adherence. As used herein, the terms cure and curable are intended to encompass materials that gel or solidify by any such methods. Photocurable adherents include materials that cure upon exposure to any of a variety of wavelengths, including visible light, UV light, and x-rays. It is also possible to use adherents that are curable by electron or particle beams. Useful adherents include photocurable adherents that are photosensitive, the term photosensitive meaning a material that changes its physical and/or chemical characteristics in response to exposure to a light source (e.g., selective, localized exposure). Such photosensitive adherents include but are not limited to certain photosensitized acrylates and vinyl monomers. Photosensitive adherents are useful because they act as both an adherent and a recording media.

It is possible for the adherent to comprise additives such as adherence-promoters, photoinitiators, absorptive materials, or polarizers. The thickness of the post-cure adherent will vary depending on several factors, including the adherent used, the method of application, the amount of adherent applied, and force exerted on the adherent by the substrates. Different thickness will be desired for different applications. Preferably, however, the photosensitive layer 124a is a volume layer with a thickness of 5 microns to 6 mm. The level of cure needed is determined by the particular adherent used and by the force required to maintain a substrate or multi-layer article with the encased optical article in the position imparted by the holder or holders. For materials that are photocurable, heat curable, or chemically curable, it is possible for suitable cures to range from a few percent to 100%. Additionally, in the method described above, photo sensitive layer 124a could be formed by mixing a matrix precursor and a photoactive monomer. Such a holographic medium is disclosed in U.S. Pat. No. 6,103,454 which is hereby incorporated in its entirety by reference.

Reflective surface 124b is preferably formed on second substrate layer 124d prior to sandwiching photosensitive layer 124a as described above. Reflective surface 124b can be formed on second substrate layer 124d by evaporating aluminum onto one face of second substrate layer 124d as is well understood in the art. Reflective surface 224b can also be adhered to one face of second substrate layer 124d by applying a dielectric coating thereto. Preferably, to protect reflective surface 124b, reflective surface 124b is placed on the face of second substrate layer 124d which will be in contact with photosensitive layer 124a.

First substrate layer 124c and second substrate layer 124d can be formed from the same or different materials and can be formed from ceramics (including glasses), metals, or plastics. The substrates can be formed in any required shape such as a square, rectangle and circle. Additionally, the substrates can be formed from a polymeric material that is sprayed onto a holder, a thin polymer film such as Mylar (R), or a polymer sheet such as polycarbonate. It is also possible for a polymeric material or film to be combined with self-supporting material such as glass plate to form a single substrate. It is also considered that first substrate layer 124c be a wave-plate which alters the polarization of the output beam from that of the signal beam. In this way, referring again to FIG. 7, if partially reflective/partially transmissive surface 126a of beam splitter 126 is a polarization selective surface, output beam 143 can be more efficiently directed to data sensor 129.

While holographic medium 124 includes two substrate layers, substrates need not be part of the holographic media used in a system in accordance with the present invention. For example the media could be a photosensitive glass or plastic that is formed into the correct media shape itself and the reflective coating applied to one side. Though holographic media for use in a system in accordance with the present invention is preferably a substantially rigid lamina, it is also within the ambit of the present invention to use tape products.

FIG. 15 is a flowchart illustrating a method of recording data in holographic form in accordance with the present invention. In step 510, the reference beam and signal beam is generated. Preferably, this is accomplished using laser 110 and source beam splitter 112 as discussed above with respect to FIG. 4. In step 512, the signal beam is encoded with the data to be stored in the holographic medium. Preferably, as discussed above with respect to FIGS. 4 and 5, the signal beam is directed by signal beam splitter 126 into reflective SLM 128 which encodes the signal beam with the data to be stored.

In step 514, the reference beam is phase correlation modulated. As discussed above, this is preferably accomplished using a phase mask such as phase mask 116 shown in FIG. 4. However, it is also considered to use other methods such as a holographic optical element, discussed below with respect to FIG. 13. In step 516 a Fourier transform of the phase modulated reference beam in generated preferably using a Fourier transform lens such as Fourier transform lens 118 discussed above and shown in FIG. 4. Then, in step 518, the zeroth order components of the Fourier transform of the reference beam are removed from reference beam. Preferably this is accomplished by spatially filtering the reference beam using, for example, a light absorptive surface of a block such as block 120 shown in FIG. 4. It is to be understood that although step 512 appears before steps 514–518 on FIG. 15, step 512 could occur before, after or simultaneous with any of steps 514–518. Then, in step 522, the reference and signal beam interfere with each other in the holographic media to generate a hologram storing the data with which the signal beam was encoded.

FIG. 16 is a flow chart illustrating a method of reading a hologram stored in a holographic media in accordance with the present invention. In step 610, a reference beam in generated to read a hologram from a holographic medium. This reference beam is preferably generated by a laser such as laser 110 shown in FIG. 7. In step 612, the reference beam is phase modulated to include the same phase content as the reference beam used to record the hologram which is to be read. This can be done by passing the reference beam through the same phase mask, such as phase mask 116 shown in FIG. 7, as was used to record the target hologram. Alternatively, the same holographic optical element, discussed below with respect to FIG. 13, that was used to record the target hologram can be used to phase modulate the reference beam in step 612. In step 614, a Fourier transform of the phase modulated reference beam is created preferably using a Fourier transform lens such as Fourier transform lens 118 as discussed above with respect to FIG. 7.

In step 616, the zeroth order Fourier components of the Fourier transformed reference beam are filtered out. As discussed above with respect to FIG. 7, this is preferably accomplished using an light absorbing surface of a block such as block 120. In step 618, the reference beam is transmitted into the holographic medium where the reference beam interferes with the target hologram to generate an output beam. In the embodiment shown in FIG. 7, this output beam is preferably reflected off of a turning mirror which is included in a reflective surface of block 120, as shown in step 620. As shown in step 622, the output beam optionally can then be transmitted through a wave-plate to rotate the polarization of the output beam. As discussed above with respect to FIG. 7, this can increase the efficiency of reflecting the beam off of a dichroic partially reflective/partially transmissive surface and into a data sensor, as shown in step 624 and discussed above with respect to FIG. 7.

As the above discussion makes clear, because a holographic storage drive in accordance with the present invention uses a reflective holographic medium, all the recording and reading optics can be located on one side of the medium. As such, a holographic storage drive of the present invention can be advantageously more compact than a drive using a transmission configuration which would include optics on both sides of the holographic medium. Additionally, a holographic storage drive of the present invention uses phase-correlation holography and filters out low spatial frequency components of the reference beam. As such relatively high selectivity between holograms can be advantageously achieved, even in a configuration in which reference and signal beams are incident on the holographic recording medium at angles at or near 90 degrees. Also, in a holographic storage drive in accordance with the present invention, polarization is not used on reconstruction to separate the reference and output beams. As such, noise in the output beam caused by incomplete filtering of the reference beam, and system and media birefringence can advantageously be avoided.

As discussed above, it is desirable to store more than a single hologram in holographic medium 124. Because reference beam 140 is phase modulated by phase mask 116, it is possible to multiplex more than one hologram in the same location in holographic medium 124. This is accomplished by altering the pattern of phase mask 116 or, more practically, changing the position of the mask relative to the optical axis for each hologram. This can result in a limited number of holograms multiplexing at the same location. This can be combined with phase correlation multiplexing as discussed below.

In addition to multiplexing holograms in the same location in holographic medium 124, it is also within the ambit of the present invention to phase correlation multiplex holograms in holographic medium 124. This can be accomplished by moving the optics of the system relative to holographic medium 124 and/or by moving medium 124 relative to the optics of the system. If optics of the system are moved, either alone or in conjunction with moving holographic medium 124, either all or a portion of the system optics may be moved. That is, it is considered that laser 110, reference beam splitter 112, turning mirror 114, phase mask 116, FT lens 118 transparent mask 123, block 120, object lens 122, signal beam splitter 126, SLM 128, and CMOS detector array and associated electronics 129 all be moved in unison or only a subset of the system optics may be moved such as is done in CD or DVDs. For example, by moving all of the elements noted above except the laser and the beam splitter 112, (that is, moving turning mirror 114, phase mask 116, FT lens 118 transparent mask 123, block 120, object lens 122, signal beam splitter 126, SLM 128, and CMOS detector array and associated electronics 129) recording or reading of holograms in different locations in a holographic medium 124 can be achieved.

One method and apparatus of moving a holographic medium with respect to system optics is to use a servo motor for driving holographic medium using a feedback system for position adjustment as is known for use in the magnetic and optical disk drive industry. FIG. 11 shows one example of a servo motor system to shift a holographic medium with respect to system optics in accordance with the present invention. Object lens 122, transparent mask 123 and reflecting block 120 are shown in FIG. 11 and the remainder of the system optics discussed above are not shown. In FIG. 11, holographic medium 124' is disk-shaped and supported by a spindle 150 which can be rotated by servo motor 152. Servo motor 152 can rotate holographic medium 124' beneath object lens 122 to allow recording and reading of holograms at different locations in holographic medium 124'.

Rotational placement of holographic medium beneath system optics to access a particular hologram can be accomplished in the same manner as information is accessed on computer hard disk drives, compact discs or digital versatile discs. Placement of information media in such applications is well understood in the art. In particular, as shown in FIG. 11, holographic medium 124' can include servo marks 210 which can be used to track the rotational position of holographic medium 124'. In addition to block 120, transparent mask 123 and object lens 122, FIG. 11 also illustrates a servo laser 244, servo beam 240 and dichroic element 242 for directing servo signal 240 onto holographic medium 124'.

Servo laser 244 is preferably located adjacent to transparent mask 123 and object lens 122 and generates servo beam 240 for detecting servo marks 210. Preferably, servo laser 244 can also generate signals to read data from a holographic or optical medium. As discussed further below, to allow discrimination between signal beam 142 and servo beam 240, the wavelength of servo beam 240 is preferably different from the wavelength of reference beam 140. Servo laser 244 directs servo signal 240 into dichroic element 242 which is preferably located between reflective surface 120b of block 120 and object lens 242. As shown in FIG. 11, because of this positioning of dichroic element, 122 at least a part of signal beam 142 will have to pass through dichroic element 242. To facilitate this, dichroic element 242 includes a partially reflective/partially transmissive surface 242a which will preferably transmit light having the wavelength of signal beam 142 and reflect light having the wavelength of servo beam 240. As such, any part of signal beam 142 incident upon dichroic element 242 will pass through. And, servo beam 240 entering dichroic element 242 from servo laser 244 will be reflected off of partially reflective/partially transmissive surface 242a and directed through object lens 122 and onto holographic medium 124'. Servo beam 240 strikes holographic medium 124' so as to be able to strike servo marks 210. When servo beam 240 strikes a servo mark 210, servo beam reflects off of servo mark 210 and is picked off by beamsplitter 245, focused onto the quad detector 246 by lens 248, which then relays detection of servo marks 210 to control feedback electronics (not shown) which control servo motor 152 to rotationally position holographic medium 124' beneath transmitted reference beam portion 140b and signal beam 142 during recording and transmitted reference beam portion during reproduction. This signal can also be used to control the radial position of the optics, and the focus position of object lens 122 by servo motors not shown. The marks can be very similar to what is used or contemplated for CD or DVD optical disks. Though in FIG. 11, a dichroic element is used, it is also considered that the servo beam be input along with the reference beam 140b through transparent mask 123. In yet another alternative, the servo beam could be input along with the signal beam and turned by a reflective surface of block 120. Additionally, transparent mask 123 could be dichroic to allow reference beam 140b to pass through transparent mask 123 and reflect the servo beam. In this way, if the servo beam is input along with signal beam 142, both the reflective surface of block 120 and transparent mask 123 could direct the signal beam through object lens 122.

The interaction of servo beam 240 with holographic medium 124' is shown in FIG. 12. FIG. 12 also illustrates signal beam 142 for comparison. As discussed above with respect to holographic medium 124, holographic medium 124' preferably includes a first substrate layer 124c' overlaying a photosensitive layer 124a', and a reflective surface 124b' between photosensitive layer 124a' and a second substrate layer 124d'. Also as discussed above, signal beam 142 is preferably focused by object lens 122 on to reflective surface 124b' of holographic medium 124'. However, as shown in FIG. 12, first substrate layer 124c' preferably includes servo marks 210. As such, servo beam 240 is preferably focused on first substrate layer 124c' to allow accurate detection of servo marks 210. As noted above, the wavelength of signal beam 142 is preferably different from the wavelength of servo beam 240. As such, is it possible to focus signal beam 142 onto reflective surface 124b' while focusing servo beam 240 onto first substrate layer 124c' by using the difference in wavelengths between servo beam 240 and signal beam 142 along with the appropriately designed objective lens 122, as is known in the art and is implemented for DVD backwards compatibility with CD.

Preferably, a holographic drive in accordance with the present invention is able not only to record and retrieve data in a holographic format, but also able to retrieve data from digital versatile discs (DVDs). The wavelength of laser light used to read DVDs is approximately 680 nm. As such, the wavelength of servo beam 240 is preferably 680 nm so that servo beam 240 can both be used to track servo marks 210 when holographic drive 100 is being used to read or record holographic data and read data from a DVD if holographic drive is being used to read a DVD.

As discussed above, block 120 acts to filter out much of the lower spatial frequencies emanating from phase mask 116. Also, as discussed above, such spatial filtration is necessary when using a conventional phase mask in order to generate a fairly sharp peaked auto-correlation function for a given phase mask. This results in good selectivity between holograms recorded with different phase masks. However, such spatial filtering can remove much of the optical energy from reference beam 140. Accordingly, in another embodiment of a holographic storage drive in accordance with the present invention, a holographic optical element (HOE) is used in the reference beam path in place of phase mask 116 and Fourier lens 118 of holographic drive 100 shown in FIG. 4.

A HOE uses a hologram to insert phase correlation information into a reference beam. HOEs are understood by those skilled in the art and discussed, for example, in U.S. Pat. No. 6,018,402 which is incorporated by reference in its entirety. The hologram used by the HOE is a recording of the wavefront of a reference beam right after the reference beam has passed through a phase mask, FT lens and a filter block such as filter block 120 of FIG. 4. The reconstruction of this hologram results in a wavefront having the phase correlation information provided by a phase mask and filtering provided by a filter block. The signal output from an HOE can be used to create a phase correlated hologram having relatively high selectivity without the need to spatially filter the phase coded reference beam. Thus, use of an HOE in place of a phase mask 116 and block 120a can increase the optical energy in the reference beam used to record a hologram in a holographic drive in accordance with the present invention since the loss of energy due to a filter block, such as filter block 120, is not incurred.

FIG. 13 illustrates a holographic drive 300 in accordance with the present invention which uses an HOE in place of a phase mask, FT lens and filter block. Many aspects of holographic drive 300 are similar to holographic drive 100 shown in FIG. 4. Holographic drive 300 includes a laser 310 for generating a source beam and a source beam splitter 312 for generating a reference beam 340 and signal beam 342. Reference beam 340 is preferably turned by turning mirror 314 before passing through HOE 316. As discussed above, HOE 316 uses a previously recorded hologram to impart the phase correlation function onto the reference beam 340. In FIG. 13, the HOE is shown normal to the optical axis, but the HOE element can also be tilted with respect to the axis as well as recorded in transmission or reflection geometry. Reference beam 340 then passes through transparent mask 323. As discussed above, because reference beam 340 is passed through HOE 316, reference beam 340 does not require spatial filtering to remove lower spatial frequency components prior to entering object lens 322. As such, reference beam 340 preferably passes entirely around block 320 and through transparent mask 323. After passing through object lens 322, reference beam 340 is preferably focused onto holographic medium 324 where it interferes with signal beam 342 to record a hologram.

After passing through source beam splitter 312, signal beam 342 enters a polarization beam splitter (PBS) 326 which is substantially the same as PBS 126 shown in FIG. 4. PBS 326 includes a partially reflective-partially transmissive surface 326a which directs signal beam 342 into reflective SLM 328 and then allows signal beam 342 to pass back through PBS 326 and through an optional wave-plate 331. As discussed above with respect to wave-plate 131 shown in FIG. 7, wave-plate 331 can be used to polarize an output beam on reconstruction to more efficiently direct the output beam into a data sensor 329, which can be substantially the same as data sensor 129. Signal beam 342 then passes through first and second lenses 332 and 334, respectively. First and second lenses 332 and 334 image SLM 328 onto a reflective surface 320b of block 320. This allows block 320 to be placed close to the image plane of the SLM 328. It is also contemplated to use only a single additional lens to accomplish this result. By placing just lens 332 and not lens 334 and setting lens 332 in a 4f configuration the hologram in the media can be recording as a image plane hologram rather than a Fourier Transform hologram. First lens 332 and second lens 334 can also be used in the described manner in a holographic drive such as holographic drive 100 shown in FIG. 4.

FIG. 14 shows another alternative embodiment of the signal and reproduction optics of a holographic storage drive 400 in accordance with the present invention. Like storage drive 100 shown in FIG. 4, signal and reproduction optics of holographic storage drive 400 include a signal beam splitter 426 for directing a signal beam to reflective SLM 428 and directing a readout beam to data sensor 429 in the same manner as described above with respect to holographic storage drive 100. Like holographic storage drive 100, drive 400 can optionally include a wave-plate 431 to shift the polarization of an output beam to provide more efficient direction of the output beam to data sensor 429 by a polarization selective surface 426a of signal beam splitter 426. Additionally, FIG. 14 shows block 420, transparent mask 423, object lens 422 and holographic medium 424, each of which preferably function as the corresponding component of holographic storage drive 100 discussed above. Preferably reference beam 440 is phase coded by either a phase mask (not shown), as discussed above with respect to holographic storage drive 100, or an HOE (also not shown) as discussed above with respect to holographic storage drive 300. In addition, holographic storage drive preferably includes lens 432 to allow image plane holograms to be recorded in holographic medium 424. The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. Many other variations are also to be considered within the scope of the present invention.

What is claimed is:

1. A holographic storage apparatus for recording data in a holographic medium including:
   at least one light source for generating a reference beam and a signal beam, the reference beam being a phase correlation beam of unchanging phase content;
   a holographic medium having at least a first face and placed in a path of the reference beam and a path of the signal beam such that both the reference beam and the signal beam enter the holographic medium through the first face to interfere in the holographic medium to create a hologram;
   a filter block having an absorptive face and a reflective face, wherein the absorptive face includes an opaque filter positioned in the path of the reference beam, and the reflective face includes a signal beam reflective surface positioned in the path of the signal beam;
   a data sensor for detecting an output beam;
   the holographic medium further including a data reflective surface such that in reading information stored in the holographic medium both the reference beam and the output beam pass through the first face of the holographic medium; and
   wherein in reading information stored in the holographic medium the reference beam is spatially separated from the output beam such that substantially no portion of the reference beam strikes the data sensor.

2. The holographic storage apparatus of claim 1 further including a phase mask positioned in a path of the reference beam between the at least one light source and the holographic medium, the phase mask to phase modulate the reference beam prior to reaching the holographic recording medium.

3. The holographic storage apparatus of claim 2 wherein the opaque filter is positioned relative to the path of the reference beam such that in recording data in the holographic medium, at least a portion of the reference beam is blocked from reaching the holographic medium by the opaque filter.

4. The holographic storage apparatus of claim 3 wherein the opaque filter includes a light reflecting surface.

5. The holographic storage apparatus of claim 4 further including a Fourier transform lens positioned in a path of the reference beam after the phase mask and to generate a Fourier transform of the reference beam.

6. The holographic storage apparatus of claim 5 wherein the opaque filter blocks a center region of the Fourier transform of the reference beam, the blocked center region including zeroth order Fourier components of the Fourier transform of the reference beam.

7. The holographic storage apparatus of claim 6 further including a signal beam reflective surface positioned in the path of the signal beam before the holographic media and for turning the signal beam to cause the signal beam to enter the holographic medium through the first face thereof.

8. The holographic storage apparatus of claim 7 wherein the signal beam reflective surface turns the signal beam along a path that is substantially parallel to an optical axis of the reference beam.

9. The holographic storage apparatus of claim 1 including a transparent mask bordering the filter block and through which at least a portion of the reference beam passes before reaching the holographic medium.

10. The holographic storage apparatus of claim 9 wherein the holographic medium includes a substrate layer and a photosensitive layer and the data reflective surface is formed on the substrate layer.

11. The holographic storage apparatus of claim 10 including:
    a beam splitter including a partially reflective/partially transmissive surface and positioned in the path of the signal beam; and
    a signal spatial light modulator (SLM) positioned such that the partially reflective/partially transmissive surface of the beam splitter directs the signal beam towards the signal SLM.

12. The holographic storage apparatus of claim 11 wherein the signal SLM includes a reflective SLM.

13. The holographic storage apparatus of claim 11 including a wave-plate positioned in the path of the output beam and wherein the beam splitter includes a polarizing beam splitter having a dichroic surface such that by passing the output beam through the wave-plate and into the polarizing beam splitter, the output beam is reflected off the dichroic surface and into the data sensor.

14. The holographic storage apparatus of claim 13 further including another lens positioned between the wave-plate the beam splitter and to allow recording of image plane holograms in the holographic medium.

15. The holographic storage apparatus of claim 1 further including a holographic optical element (HOE) positioned in a path of the reference beam between the at least one light source and the holographic medium, the HOE to phase modulate the reference beam prior to reaching the holographic recording medium.

16. The holographic storage apparatus of claim 1 including:
   servo marks associated with the holographic medium and for providing information about the position of the holographic medium;
   a servo beam source for generating a servo beam and positioned to cause the servo beam to strike the servo marks on the holographic medium; and
   a detector for detecting an interaction between the servo beam and the servo marks;
   wherein the holographic medium can be repositioned with respect to the holographic storage device and detection of the interaction between the servo beam and the servo marks provides information concerning the position of the holographic medium with respect to the holographic storage device.

17. A holographic storage apparatus for managing data including:
   at least one light source for generating a reference beam and a signal beam the signal beam for carrying information to be stored by the storage apparatus;
   a holographic medium including a first face, the holographic medium positioned in a path of the reference beam and a path of the signal beam such that both the reference beam and the signal beam can enter the holographic medium through the first face thereof;
   a phase mask positioned in a path of the reference beam between the at least one light source and the holographic medium, the phase mask to phase modulate the reference beam prior to reaching the holographic recording medium;
   a signal beam reflective surface positioned relative to the path of the reference beam and a path of the object beam such that in recording data in the holographic medium, at least a portion of the reference beam bypasses the signal beam reflective surface and interferes within the holographic medium with the signal beam after the signal beam has reflected off the signal beam reflective surface; and
   a data reflective surface included in the holographic medium such that in reading information stored in the holographic medium the reference beam and an output beam both pass through the first face of the holographic medium and the reference beam is spatially separated from the output beam such that substantially no portion of the reference beam strikes the data sensor; and
   a filter block having an absorptive face and a reflective face and positioned such that the absorptive face includes an opaque filter and the reflective face includes the signal beam reflective surface.

18. The holographic storage apparatus of claim 17 wherein the signal beam reflective surface turns the signal beam along a path that is substantially parallel to an optical axis of the reference beam.

19. The holographic storage apparatus of claim 18 further including a Fourier transform lens positioned in a path of the reference beam after the phase mask and to generate a Fourier transform of the reference beam.

20. The holographic storage apparatus of claim 19 wherein the opaque filter is positioned relative to the path of the reference beam such that in recording data in the holographic medium, at least a portion of the reference beam is blocked from reaching the holographic medium by the opaque filter.

21. The holographic storage apparatus of claim 20 wherein the opaque filter includes a light reflecting surface.

22. The holographic storage apparatus of claim 20 wherein the opaque filter blocks a center region of the Fourier transform of the reference beam, the blocked center region including zeroth order Fourier components of the Fourier transform of the reference beam.

23. The holographic storage apparatus of claim 17 including a transparent mask bordering the filter block and through which at least a portion of the reference beam passes before reaching the holographic medium.

24. The holographic storage apparatus of claim 23 including:
   a beam splitter having a partially reflective/partially transmissive surface and positioned in the path of the signal beam; and
   a signal SLM positioned such that the partially reflective/partially transmissive surface of the beam splitter directs the signal beam towards the signal SLM.

25. The holographic storage apparatus of claim 24 wherein the holographic medium includes a substrate layer and a photosensitive layer and the data reflective surface is formed on the substrate layer.

26. The holographic storage apparatus of claim 25 wherein:
   in reading information stored in the holographic media at least a portion of the reference beam is transmitted through the transparent mask and reflected off the data reflective surface of the holographic medium to generate an output beam; and
   the output beam is reflected off the signal beam reflective surface before being detected by the data sensor.

27. The holographic storage apparatus of claim 26 including a wave-plate positioned in the path of the output beam and wherein the beam splitter includes a polarizing beam splitter having a dichroic surface such that by passing the output beam through the wave-plate and into the polarizing beam splitter, the output beam is reflected off the dichroic surface and into the data sensor.

28. The holographic storage apparatus of claim 25 including a wave-plate positioned in the path of the output beam and wherein the beam splitter includes a polarizing beam splitter such that by passing the output beam through the wave-plate and into the polarizing beam splitter, the output beam is reflected off the polarizing beam splitter and into the data sensor.

29. The holographic storage apparatus of claim 28 wherein the reflective surface turns the signal beam along a path that is substantially parallel to the second portion of an optical axis of the reference beam.

30. The holographic storage apparatus of claim 29 further including an annular filter positioned in a path of the output beam and to confocally filter out noise in the output beam.

31. A method of managing data using a storage medium including:
   generating a reference beam and a signal beam, the signal beam including information to be managed;
   phase modulating the reference beam;

positioning a block in both the path of the signal beam and at least a portion of the path of the reference beam;

reflecting the signal beam off a signal beam reflective surface of a first face of the block before the signal beam reaches a holographic medium, the holographic medium having a first face and a data reflective surface;

passing at least a portion of the reference beam through a transparent mask surrounding the block;

causing both the signal beam and the reference beam to enter the holographic medium through the first face thereof;

reflecting at least one of the signal beam and the reference beam off the data reflective surface of the holographic medium;

interfering the signal beam and the reference beam in the holographic medium to create a phase-correlation hologram therein; and reading out information stored in the holographic medium by passing both the reference beam and an output beam through the first face of the holographic medium and spatially separating the reference beam from the output beam such that substantially no portion of the reference beam strikes a data sensor for detecting the output beam.

32. The method of claim 31 wherein the step of phase modulating the reference beam includes passing the reference beam through a phase mask to phase modulate the reference beam before the reference beam reaches the holographic medium.

33. The method of claim 32 further including:
passing the reference beam through a Fourier transform lens after phase modulating the reference beam and to generate a Fourier transform of the reference beam; and
spatially filtering out a center region of the Fourier transform of the reference beam, the filtered out center region including zeroth order components of the Fourier transform of the reference beam.

34. The method of claim 33
wherein the step of spatially filtering out a center region of the Fourier transform of the reference beam includes blocking the center region of the Fourier transform of the reference beam.

35. The method of claim 31 further including:
directing the signal beam into a signal SLM by;
passing the signal beam through a beam splitter which includes a partially reflective/partially transmissive surface;
reflecting the signal beam off of the partially reflective/partially transmissive surface and into the SLM.

36. The method of claim 35 wherein reading information stored in the holographic medium includes:
transmitting at least a portion of the reference beam through the transparent mask;
reflecting the transmitted portion of the reference beam off the reflective surface in the holographic medium to generate an output beam;
reflecting the output beam off the signal reflective surface; and
directing the output beam into the data sensor.

37. The method of claim 36 further including:
positioning a wave-plate in a path of the output beam between the signal reflective surface and the beam splitter to alter the polarization of the output beam;
providing a polarizing beam splitter;
reflecting the output beam off the polarizing beam splitter and into the output light detector.

38. The method of claim 31 further including:
associating servo marks with the holographic medium for providing information about the position of the holographic medium;
reflecting a servo beam off the servo marks;
detecting the servo beam reflected off the servo marks to determine the position of the holographic medium.

39. The method of claim 38 further including:
focusing the servo beam at a location of data tracks on a digital versatile disk (DVD);
generating both a data signal and a servo signal from the servo laser to read information from the DVD.

40. The method of claim 31 wherein the step of phase modulating the reference beam includes passing the reference beam through an HOE before the reference beam strikes the holographic medium.

* * * * *